US012292176B2

(12) United States Patent
Nolan et al.

(10) Patent No.: US 12,292,176 B2
(45) Date of Patent: May 6, 2025

(54) MODULAR AUXILIARY LIGHTING SYSTEM WITH ASYMMETRICAL ILLUMINATION SOURCES

(71) Applicant: M3 Innovation, LLC, Syracuse, NY (US)

(72) Inventors: Christopher D. Nolan, Camillus, NY (US); Joseph R. Casper, Baldwinsville, NY (US)

(73) Assignee: M3 INNOVATION, LLC, Syracuse, NY (US)

( * ) Notice: Subject to any disclaimer, the term of this patent is extended or adjusted under 35 U.S.C. 154(b) by 0 days.

(21) Appl. No.: 18/374,303

(22) Filed: Sep. 28, 2023

(65) Prior Publication Data

US 2025/0109830 A1 Apr. 3, 2025

Related U.S. Application Data

(60) Provisional application No. 63/377,854, filed on Sep. 30, 2022.

(51) Int. Cl.

| | |
|---|---|
| ***F21S 9/02*** | (2006.01) |
| ***F21V 5/00*** | (2018.01) |
| ***F21V 21/116*** | (2006.01) |
| ***F21V 23/00*** | (2015.01) |
| ***F21V 23/04*** | (2006.01) |
| ***H05B 47/14*** | (2020.01) |
| *F21W 131/105* | (2006.01) |

(52) U.S. Cl.

CPC .............. *F21S 9/024* (2013.01); *F21V 5/007* (2013.01); *F21V 21/116* (2013.01); *F21V 23/008* (2013.01); *F21V 23/0435* (2013.01); *H05B 47/14* (2020.01); *F21W 2131/105* (2013.01)

(58) Field of Classification Search

CPC ................................ F21S 9/024; H05B 47/14

See application file for complete search history.

(56) References Cited

U.S. PATENT DOCUMENTS

| | | | | |
|---|---|---|---|---|
| 2010/0246194 | A1* | 9/2010 | Nankil | F21V 7/0008 362/368 |
| 2011/0044033 | A1* | 2/2011 | Zheng | F21S 9/035 362/183 |
| 2011/0187270 | A1* | 8/2011 | Summerford | F21V 21/108 315/162 |
| 2013/0094208 | A1* | 4/2013 | Gill | F21S 8/088 362/249.02 |
| 2014/0240971 | A1* | 8/2014 | Szprengiel | H01R 33/06 362/217.13 |
| 2021/0039922 | A1* | 2/2021 | Mandy | F21S 9/024 |
| 2021/0160977 | A1* | 5/2021 | Nolan | H05B 47/20 |
| 2023/0044955 | A1* | 2/2023 | Bovino | H05B 47/184 |

* cited by examiner

*Primary Examiner* — Zheng Song

(57) ABSTRACT

A lighting system, having a lighting module; an auxiliary lighting module connected to a pole, the auxiliary lighting module having a coupler; a housing extending along a longitudinal axis and having an elongated opening, the housing containing an illumination source therein extending along the longitudinal axis; a battery; and a controller stack connected to the lighting module and the auxiliary lighting module by wiring. The controller stack has an alternating current power supply and a switching circuit having a voltage monitor connecting the alternating current power.

21 Claims, 28 Drawing Sheets

MODULAR AUXILIARY LIGHTING SYSTEM WITH ASYMMETRICAL ILLUMINATION SOURCES

CROSS-TO RELATED APPLICATIONS

The present application claims priority to U.S. Provisional Pat. Application No. 63/377,854, filed on Sep. 30, 2022, which is hereby incorporated by reference in its entirety.

BACKGROUND OF THE INVENTION

Technical Field

The present invention relates to sports field and stadium auxiliary lighting systems and, more specifically, to a modular auxiliary lighting system employing asymmetric illumination sources.

Background Information

At sports fields and stadiums, lighting systems are employed to allow sports and other events to continue after sunset or indoors. Whether by accepted standards or law, in the event of an emergency where there is a loss of power to the main lighting systems, facilities are equipped with auxiliary or emergency lighting to allow the patrons of the facility to move to safety. Many municipal sports fields as well as elementary to high-school level venues fail to provide efficient and effective lighting systems in the event of a loss of power. When there is a loss of power to the main lighting system, a generator is often used to switch on to power a separate system of emergency lights. This system is slow to switch on, requires a lot of space for generators, is expensive, and can be noisy.

SUMMARY OF THE INVENTION

The present disclosure is directed toward systems, methods, and devices providing auxiliary lighting.

In one disclosed embodiment, a modular auxiliary lighting system is connected to a field lighting system. The field lighting system has a circuit in the lighting system's power supply configured to detect a drop in voltage to the main lights and provide a signal indicating a power outage. The circuit is connected to a master controller, and on experiencing a drop in potential from 14 volts to 9 volts, the circuit notifies a master controller, and the master controller directs the power supply to switch from AC power to power provided by a battery. The battery is attached to the spine of the field lighting system and the battery is connected to the modular auxiliary lighting system. The battery provides 12-14 volts and has a storage capacity to power the auxiliary emergency lighting for 20 minutes. The master controller switches to battery power below a set threshold but before there is a complete loss of power. The emergency lighting switches on nearly immediately after power to the main lighting system falls below the set threshold. When the master controller detects a drop in voltage, it signals the field lighting system to activate connected communication and monitoring devices. Examples include activating camera system and notifying the operator of the field.

Another disclosed embodiment is a lighting system with a lighting module, an auxiliary lighting module connected to a pole and the lighting module having a coupler, a housing extending along a longitudinal axis and having an elongated opening and containing an illumination source therein extending along the longitudinal axis, a battery, and a controller stack connected to the lighting module and the auxiliary lighting module by wiring. The controller stack has an alternating current power supply and a switching circuit having a voltage monitor connecting the alternating current power supply and the battery. The voltage monitor detects a voltage drop threshold.

Another disclosed embodiment is an auxiliary lighting module connected to a pole and the auxiliary lighting module having a coupler; a housing extending along a longitudinal axis and having an elongated opening, the housing containing an illumination source therein extending along the longitudinal axis; a battery; a switching module connected to a power supply, the battery, and the lighting module, the switching module having a switch and a voltage monitor connected to the switch and detecting a voltage drop threshold, the voltage monitor engaging the switch below a set voltage drop threshold.

These, and other objects, features and advantages of this invention will become apparent from the following detailed description of the various aspects of the invention taken in conjunction with the accompanying drawings.

BRIEF DESCRIPTION OF THE DRAWINGS

The present invention will be more fully understood and appreciated by reading the following detailed Description in conjunction with the accompanying drawings, in which.

DETAILED DESCRIPTION OF THE INVENTION

The disclosed invention will be discussed in detail in terms of various exemplary embodiments with reference to the accompanying drawings. In the following detailed description, numerous specific details are set forth to provide a thorough understanding of the present invention. To those skilled in the art, it will be obvious that the present invention may be practiced without these specific details. Similarly, well-known structures are not described to avoid obscuring the present invention.

Thus, the implementations described below are exemplary implementations provided to enable persons skilled in the art to make or use the embodiments of the disclosure and are not intended to limit the scope of the disclosure, which is defined by the claims.

Furthermore, there is no intention to be bound by any expressed or implied theory presented in the preceding technical field, background, summary, or the following detailed description. It is also to be understood that the specific devices and processes illustrated in the attached drawings, and described in the following specification, are simply exemplary embodiments of the inventive concepts defined in the claims. Specific dimensions and other physical characteristics relating to the embodiments disclosed are not to be considered as limiting unless the claims expressly state so.

Likewise, the various figures, steps, procedures, and workflows are presented only as an example and in no way limit the systems, methods, or apparatuses described to performing their respective tasks or outcomes in different timeframes or orders. Unless expressly stated, any method set forth herein shall not be construed as requiring that its steps be performed in a specific order. The teachings of the present invention may be applied to any auxiliary lighting system.

The various embodiments described herein provide for systems, devices, and methods for auxiliary lighting systems: particularly, for auxiliary lighting systems for sports and auxiliary lighting systems for asymmetric source sports lighting systems.

Figure 1:
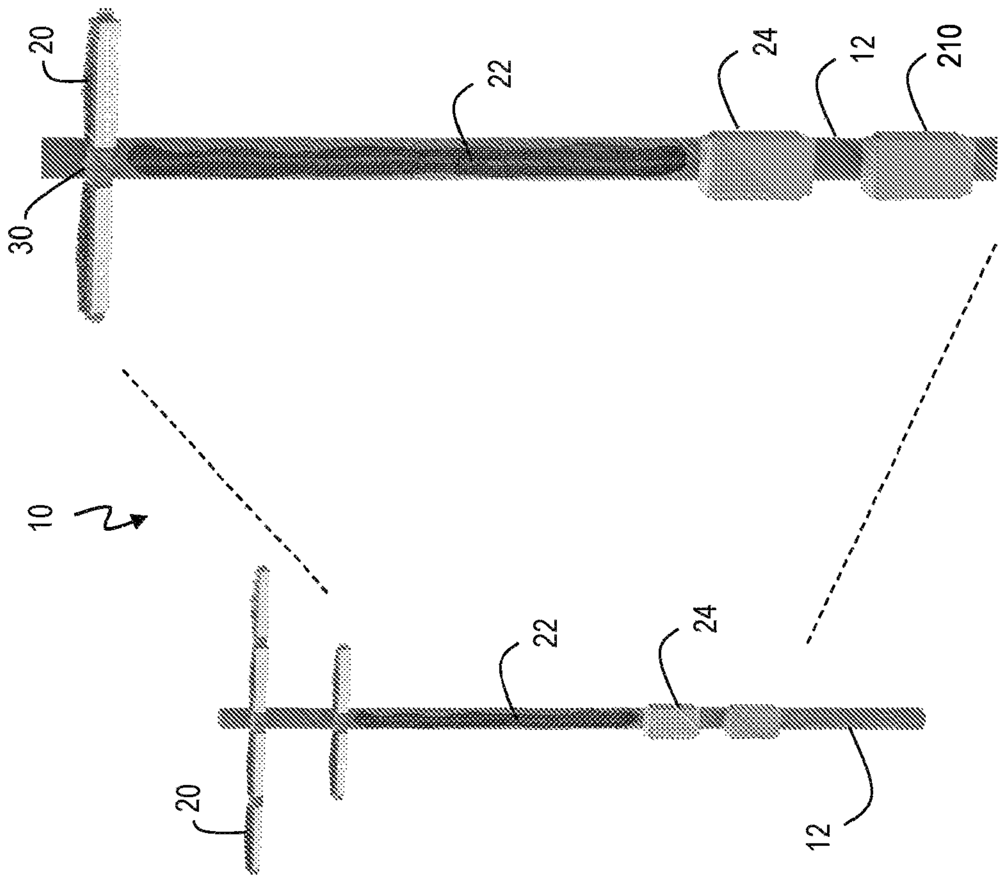
FIG. 1 is a perspective view of an asymmetric source sports lighting system in accordance with an embodiment of the disclosed invention.

Referring to the figures, wherein like numerals refer to like parts throughout, there is seen in FIG. 1 an asymmetric source sports lighting system 10 according to the present invention. System 10 is designed for installation on a support pole 12 to provide illumination over a target area 14, such as a sporting field or pitch. System 10 includes one or more rows of light emitting diode (LED) lighting modules 20 that extend laterally from support pole 12. In other embodiments, the lighting modules 20 may extend parallel to support pole 12. Lighting modules 20 are powered via a wiring harness 22 that extends along the interior of support pole 12 and is coupled to a controller stack 24. Controller stack 24 transforms local building power from AC to DC and includes LED drivers 26 for lighting modules 20. A battery 210 is connected to support pole 12, with connected by internal wiring to the controller stack 24. The controller stack 24 charges the battery 210 from transformed local building power while AC power is received by a power supply. Instead of a battery, the system may use a local power supply consisting of one or more batteries, supercapacitors, ultracapacitors, or a renewable energy source.

In the event of black-out or brown-out conditions or a drop below a threshold voltage, the power supply is switched to battery 210 power the lighting modules 20 or a subset of lighting modules. The lighting module may be of any configuration that is conducive to providing lighting for a sports field or stadium. The threshold voltage may be an approximately 1%, 2%, 3%, 5%, 6%, or 10% drop in potential (with an error of ±0.1%). The threshold voltage may be an approximately 10%, 15%, 20%, 30%, 35%, 40%, 45%, 50% or 100% drop in potential (with an error of ±1.0% or ±2.0%). A threshold voltage drop may be one that causes the light fixtures in an outdoor lighting system to dim and not illuminate at full brightness or shut off entirely. An example of a threshold voltage drop is a drop in potential from 14 volts to 9 volts or less.

Figure 2:
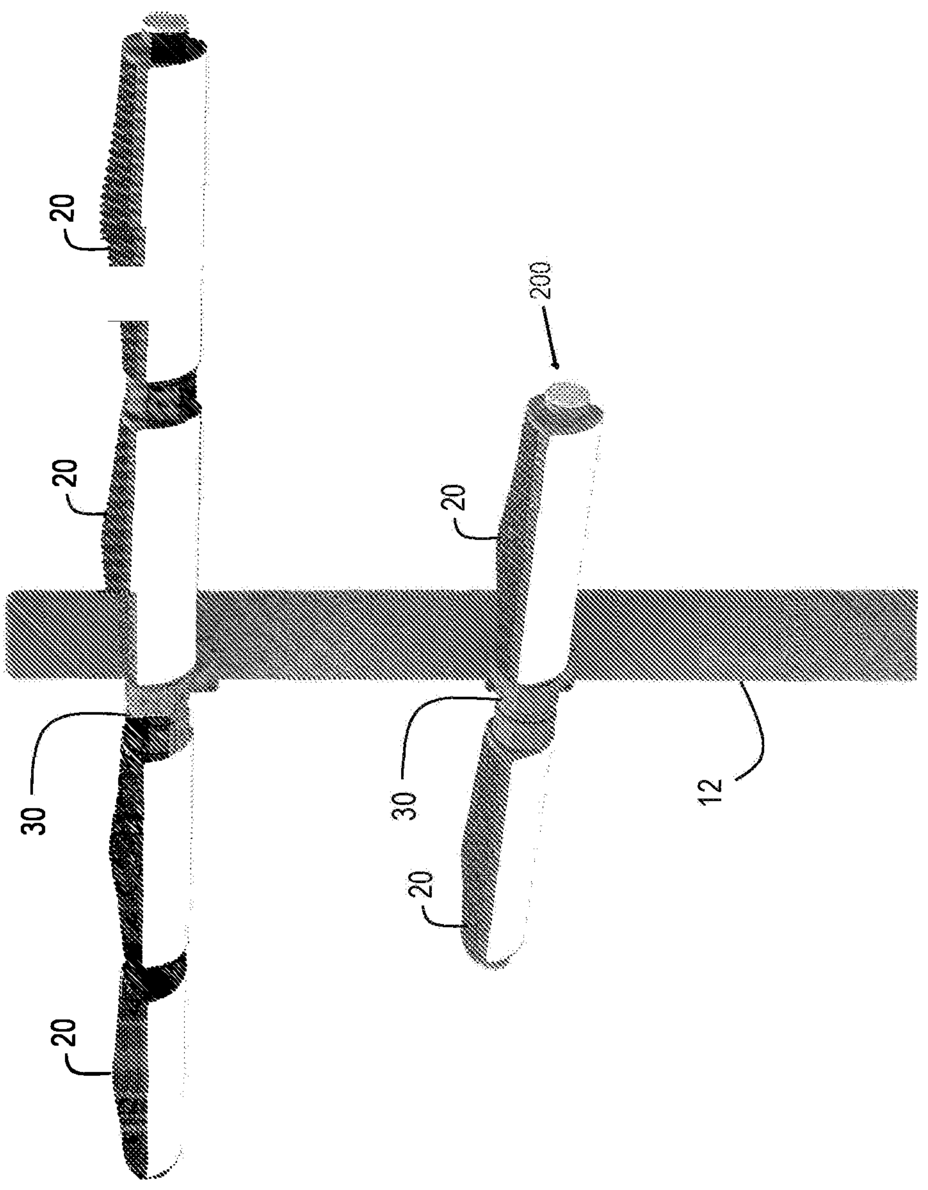
FIG. 2 is a perspective view of the upper portion of a support pole of an asymmetric source sports lighting system in accordance with an embodiment of the disclosed invention.

Referring to FIG. 2, a central mount 30 is coupled to pole 12 and used to support first and second lighting modules 20. Lighting modules 20 are coupled to either side of mount 30 using a modular coupling system described herein that physically supports modules 20 and electronically interconnects modules 20 to wiring harness 22 and thus controller stack 24. The opposing end of each lighting module 20 coupled to mount 30 may be used to physically support and electronically interconnect to additional lighting modules 20 extending further outwardly from support pole 12. The combination of lighting modules 20 connected to mount 30 and the additional lighting modules 20 extending to either side of pole 12 are self-supporting so that support pole 12 does not need to include physical cross-arms or lateral supports to mount additional lighting modules 20. The particular dimensions of lighting module 20 may be varied as desired. For example, lighting module 20 could be provided in two lengths, X and 2X, that may be mixed and matches as needed for a particular installation. The lighting module may be of any configuration that is conducive to providing lighting for a sports field or stadium.

Continuing with reference to FIG. 2, two sets of lighting modules are depicted. The second set of lighting modules may be, for example, auxiliary emergency lighting 200. Auxiliary emergency lighting 200 may be turned off during normal lighting conditions and activated when emergency conditions arise. In other embodiments, auxiliary emergency lighting 200 may operate during normal lighting conditions but remain activated during emergency conditions. The auxiliary emergency lighting may be disposed underneath the first set of lighting modules, placed on one or more ends of the first set of lighting modules or in another location conducive to lighting a sports field or stadium.

Figure 3:
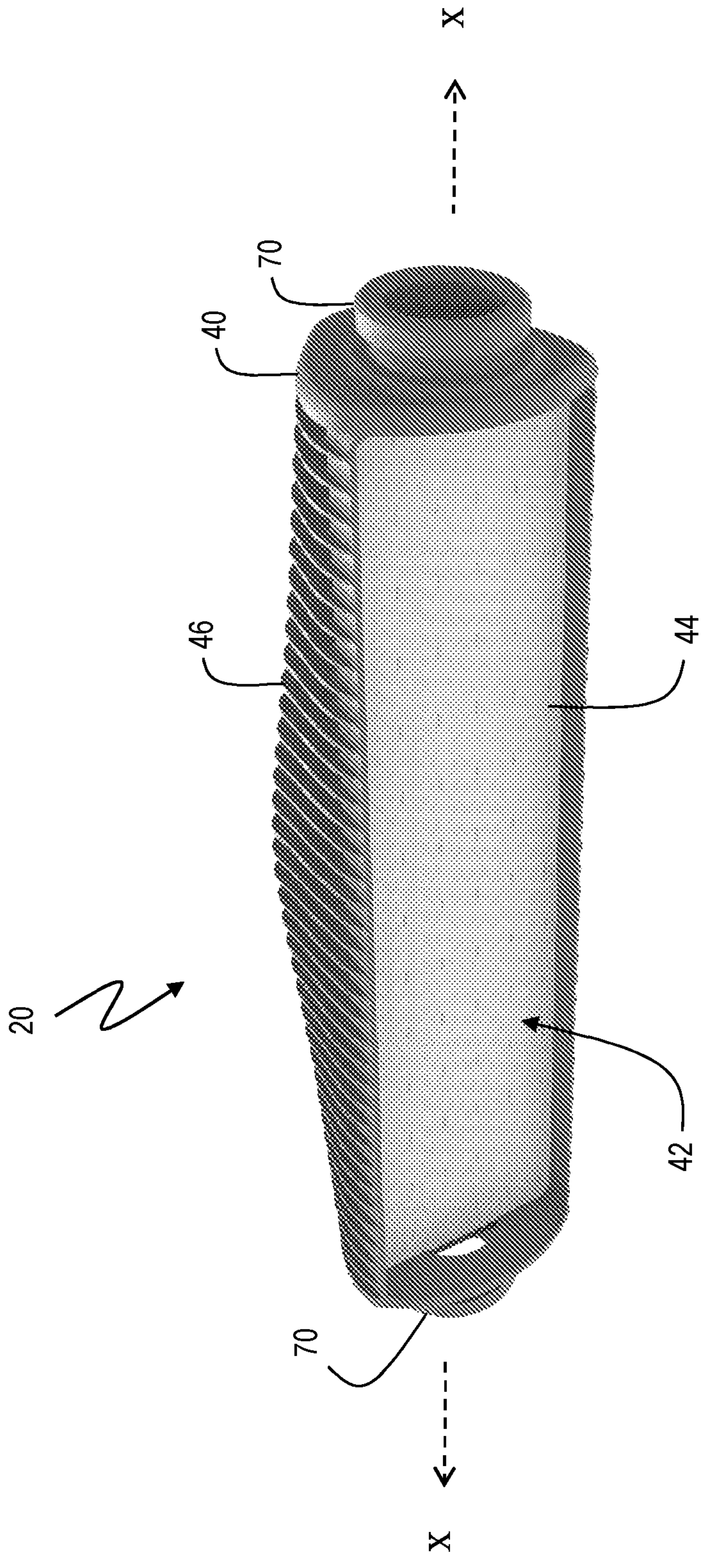
FIG. 3 is a perspective view of the asymmetric lighting source for a lighting module in accordance with an embodiment of the disclosed invention.

Referring to FIG. 3, each lighting module 20 includes a housing 40 extending along a longitudinal axis X-X. Housing 40 defines a rectangular opening 42 in a central portion thereof that permits access to an asymmetric illumination source 44. Asymmetric illumination source 44 is dimensioned to produce a rectangular beam of illumination from rectangular opening 42 of module 20. Housing 40 may further include fins 46 or other external structures for dispersing heat generated by using asymmetric illumination source 44.

Figure 4:
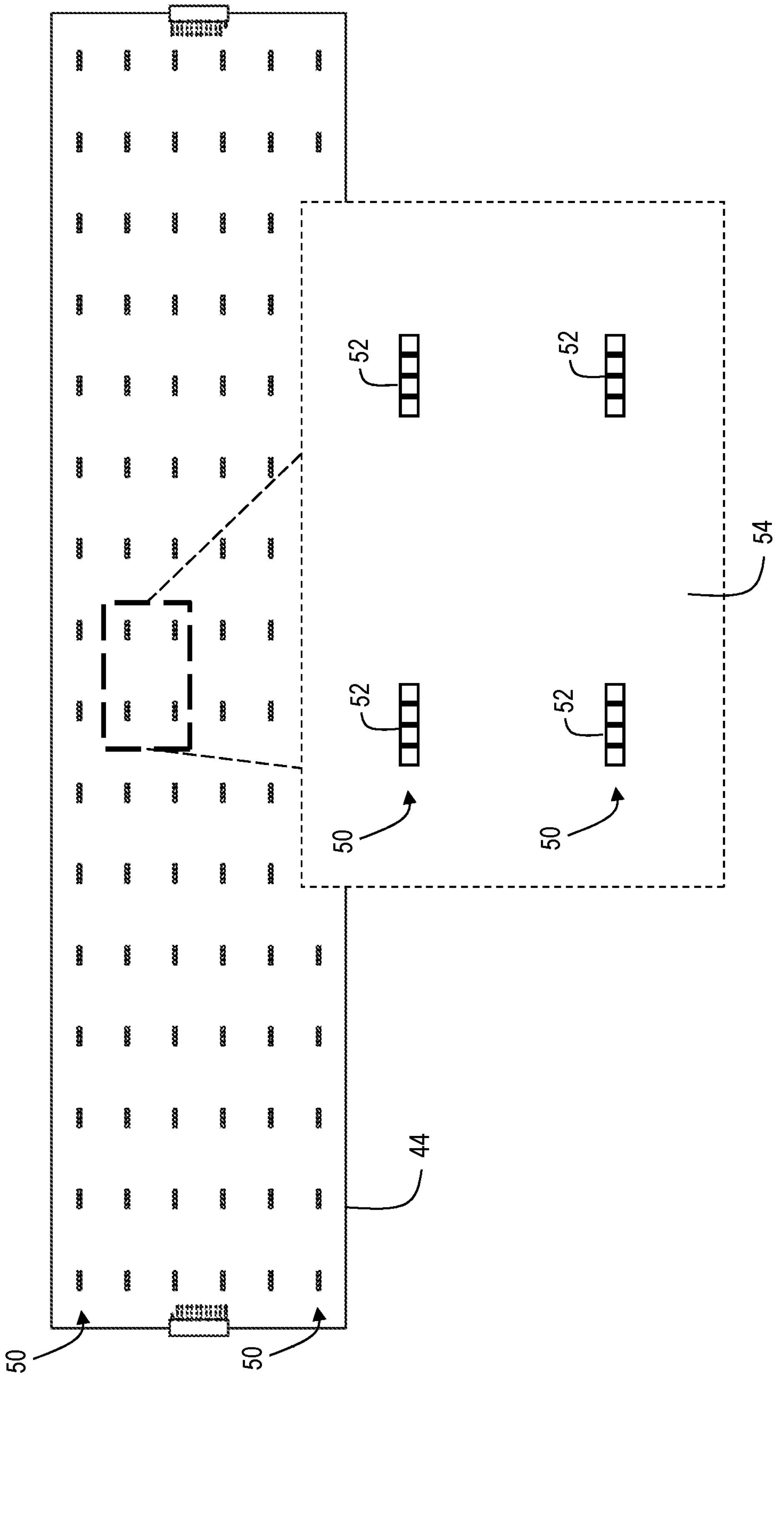
FIG. 4 is a mechanical view of the light emitting diode (LED) layout for an asymmetric lighting source in accordance with an embodiment of the disclosed invention.
Figure 5:
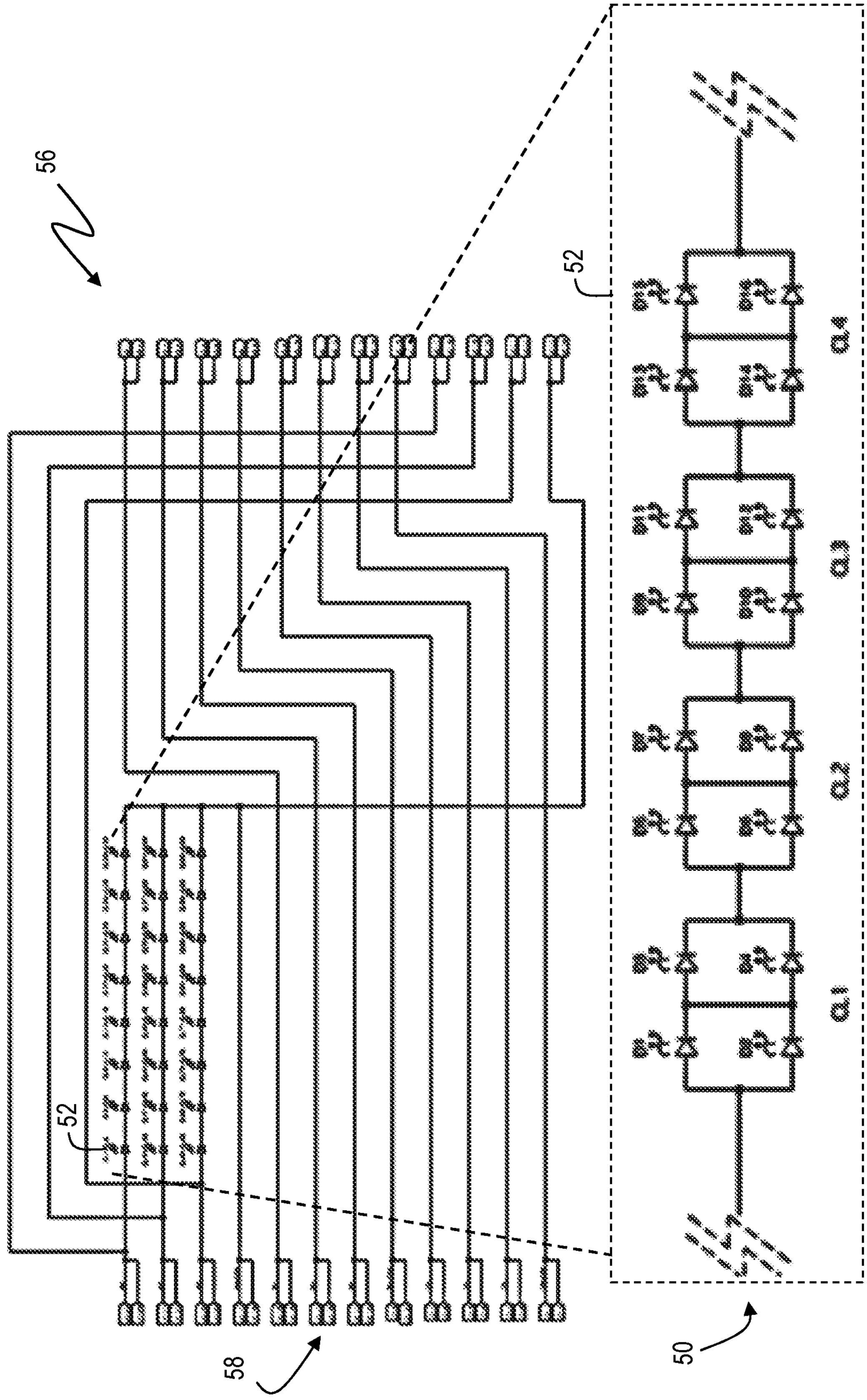
FIG. 5 is schematic of the electronics for an asymmetric lighting source in accordance with an embodiment of the disclosed invention.

Referring to FIGS. 4 and 5, asymmetric illumination source 44 comprises multiple rows 50 of light emitting diode (LED) sets 52 spaced along a substrate 54 and coupled to electronic circuitry 56 for asymmetrically driving illumination source 44. Each row 50, or optionally, each pair of rows 50, are independently controllable by adjusting the amount of power delivered to that row (or pair or rows) using electronic circuitry 56 and controller stack 24 to provide asymmetric illumination from module 20. Optionally, a local microcontroller in each module 20 can be for further adjustment of the amount of power provided to each row (or pair or rows) of LED sets.

As seen in FIG. 5, asymmetric illumination source 44 has three independently controllable rows 50 of LED sets 52. Electronic circuitry 56 further includes pass-through circuitry 58 for providing power to adjacently connected lighting modules 20 that also include independently controlled rows 50 of LED sets 52.

Figure 6:
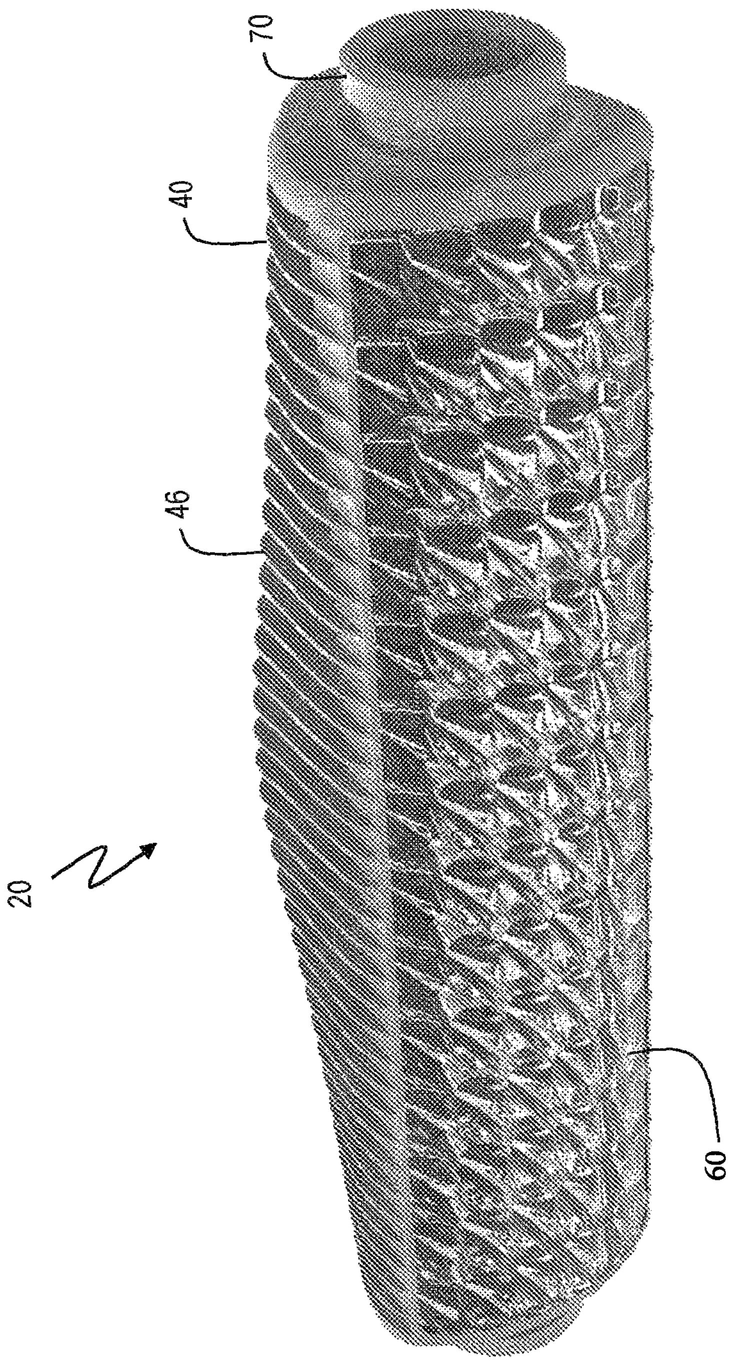
FIG. 6 is a perspective view of a lens assembly of a lighting module in accordance with an embodiment of the disclosed invention.

In the example of FIG. 5, a total of two additional lighting modules 20 may be interconnected and supported by circuitry 58. As seen in FIG. 6, a molded lens array 60 is positioned over an asymmetric illumination source 44 to reduce harshness and provide sealing of asymmetric illumination source 44 within housing 40.

Figure 7:
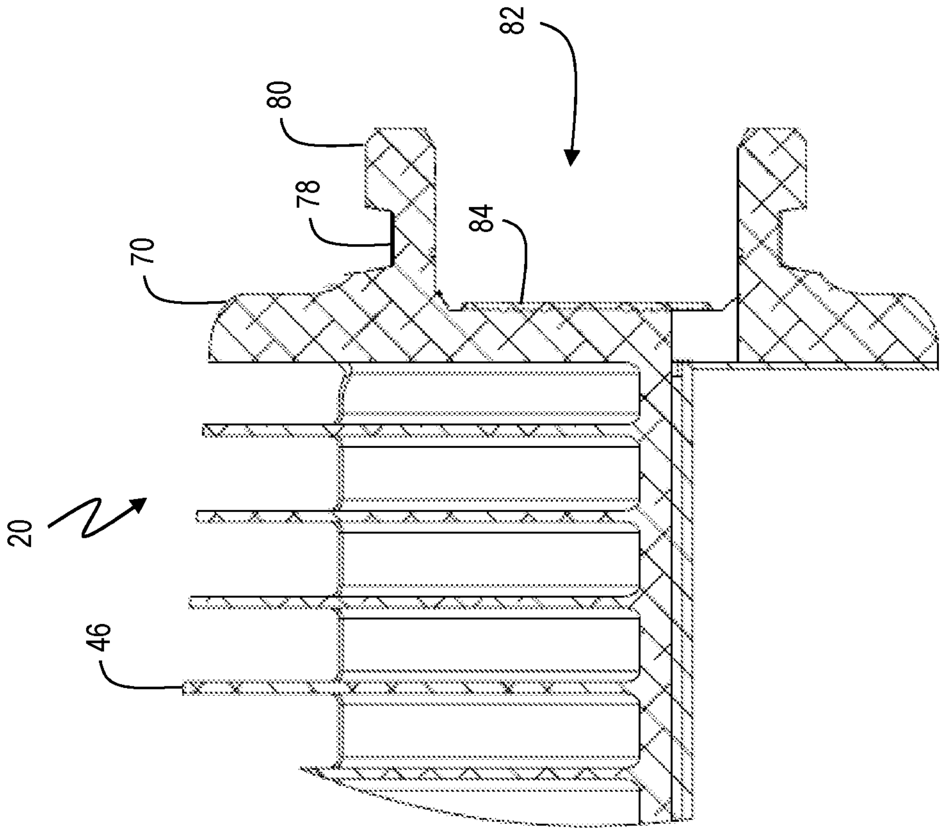
FIG. 7 is a cross-sectional view of the coupler of a lighting module in accordance with an embodiment of the disclosed invention.
Figure 8:
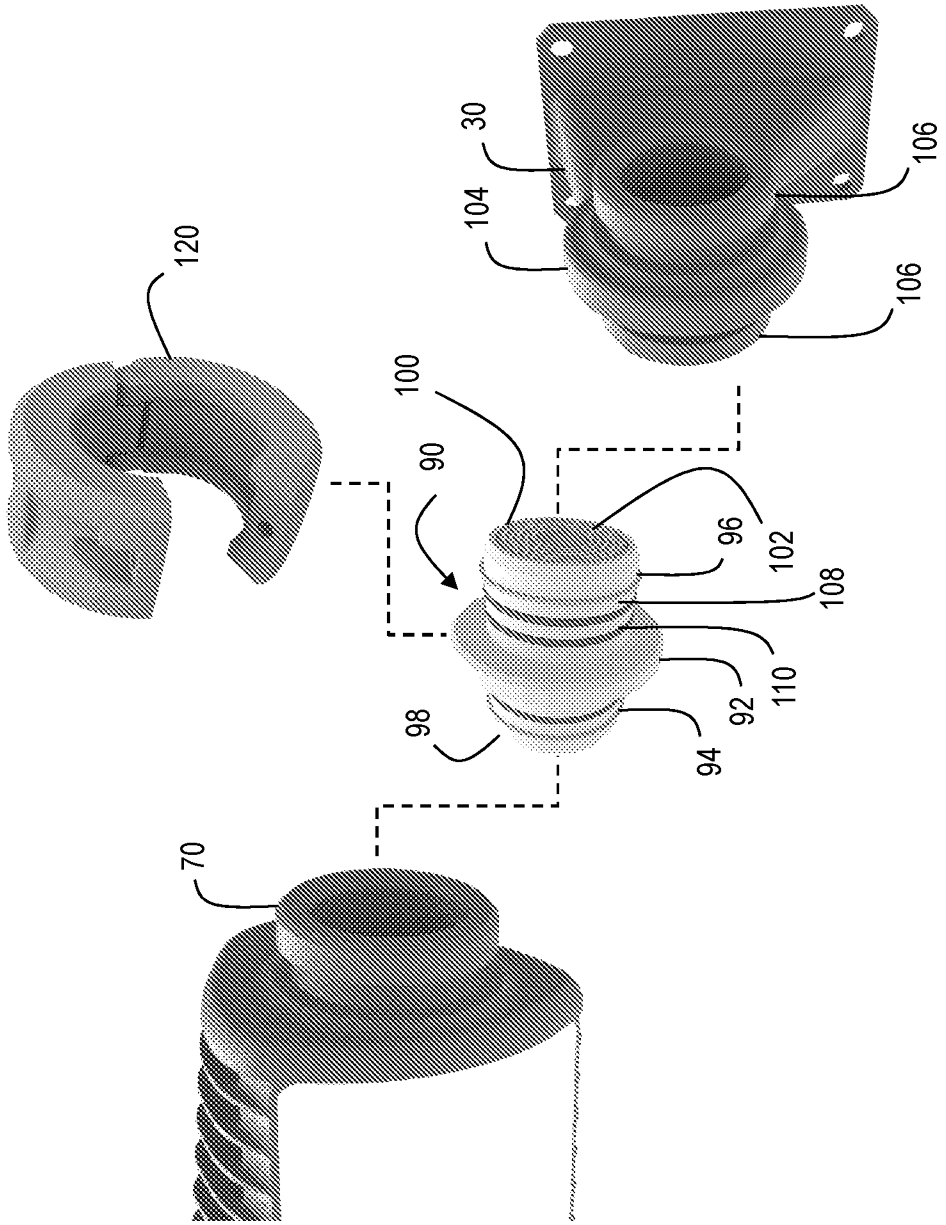
FIG. 8 is an exploded view of a lighting module coupling and mount connection assembly in accordance with an embodiment of the disclosed invention.

Referring to FIGS. 7 and 8, housing 40 of module 20 is configured to allow for coupling to a supporting structure as well electronic connections. Housing 40 includes a pair of couplers 70 positioned at opposing ends of module 20. Each coupler 70 is defined by a cylindrical portion 78 extending outwardly from housing 40 that terminates in a flange 80 that extends radially outwardly and transverse to axis X-X to a larger diameter than cylindrical portion 78. Each coupler 70 further includes a central bore 82 providing access to a set of concentrically positioned brush contacts 84 that are interconnected to electronic circuitry 56 within housing 40. Brush contacts 84 face outwardly along axis X-X. It should be recognized that other contacts may be used, such as pogo pins and the like.

Referring to FIG. 8, a link 90 that is dimensioned to be received within coupler 70 of housing 40 is used to interconnect lighting module 20 to another lighting module 20 or central mount 30. Link 90 comprises a central disk 92 positioned between first and second cylindrical bearing surfaces 94 and 96 that extend outwardly from disk 92. The end faces 98 and 100 of cylindrical bearing surfaces 94 and 96 each include a set of concentrically positioned conductive rings 102 that correspond to and will interconnect with concentrically positioned brush contacts 84 within coupler 70. Mount 30 comprises a central ridge 104 supporting a pair of couplers 106 on either side. Couplers 106 of mount 30 are structured in the same manner as couplers 70 of lighting module 20 to include an internal set of brush contacts 84 that are biased outwardly, except brush contacts 84 of mount 30 are interconnected to wiring harness 22. It should be recognized that lighting module 20 could also be designed with one coupling 70 having brush contacts 84 and the other coupling 70 having outwardly facing conductive rings 102, thereby eliminating the need for link 90. In this configuration, however, lighting module 20 would not be bi-directional.

Figure 9:
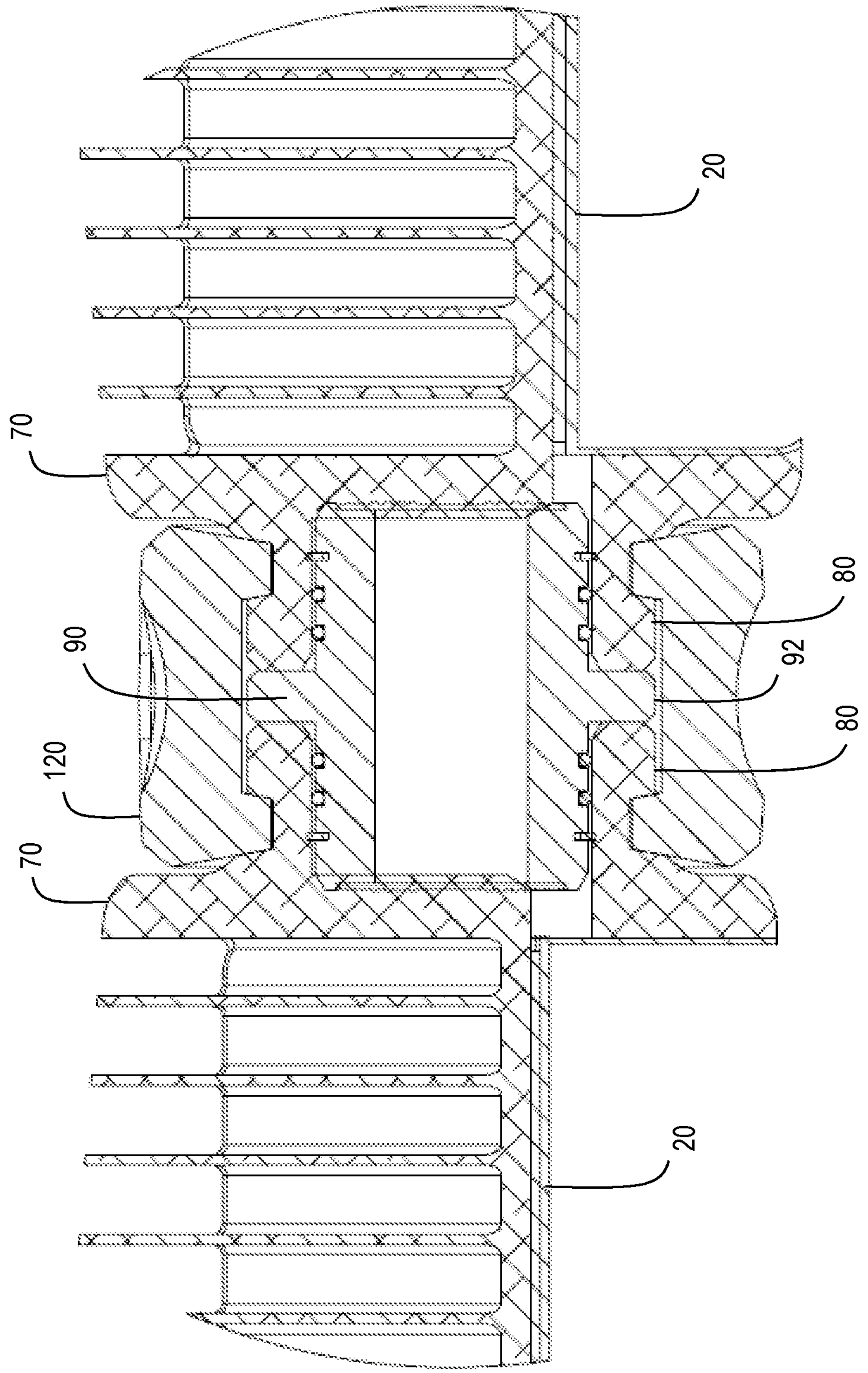
FIG. 9 is cross-sectional view of a lighting module-to-lighting module connection and link connection assembly in accordance with an embodiment of the disclosed invention.

As seen in FIG. 9, link 90 structurally interconnects housing 40 of lighting module 20 to support pole 12 and electronically interconnects electronic circuitry 56 of lighting module 20 to control stack 24. Bearing surfaces 94 and 96 of link 90 may include one or more ridges 108 for securing link 90 within a coupler 106 of mount 30 and coupler 70 of lighting module 20. For example, corresponding ridges on link 90 and grooves formed in the interior surface of coupler 70 and coupler 106 may be used to provide a snap engaging relationship. Link 90 may also include a pair (or more) of O-rings 110 for providing an environment seal when assembled with mount 30 and lighting module 20. As seen in FIG. 9, insertion of link 90 into coupler 70 allows brush contacts 84 of coupler 70 and conductive rings 102 of link 90 to come into direct contact and thus electrically interconnect lighting module 20 with link 90. Similarly, insertion of link 90 into coupler 106 of mount 30 allows conductive rings 102 of link 90 to come into direct contact and thus electrically interconnect link 90 to wiring harness 22. As a result, lighting module 20 is electrically interconnected to controller stack 24. It should be recognized that the electrical connections could be reversed with ring contacts be positioned on link 90 and conductive rings within coupler 70 or that other approach that provide electrical communication between rotating elements could be used. Module 20 is secured to mount 30 using a hinged clamp 120 that is closed about couplers 70 and 106 and locked in place, such as via a bolt or screw passed through the free ends 122 and 124 of clamp 120 when it fully closed about couplers 70 and 106. More specifically, clamp 120 is dimensioned and configured to simultaneously engage flanges 80 of any adjacent couplers 70 or 106.

Figure 10:
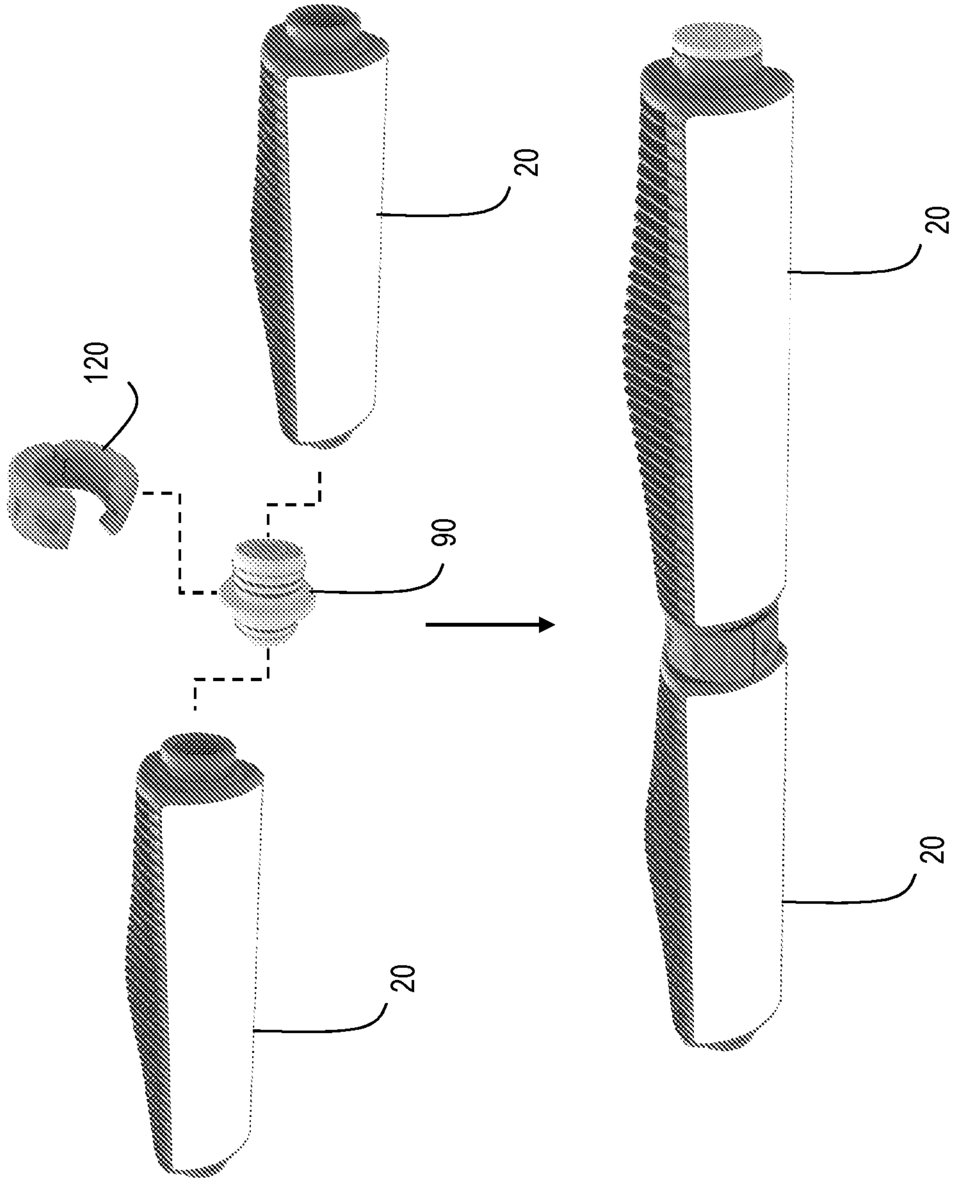
FIG. 10 is a perspective view of two lighting modules in the disconnected and connected positions in accordance with an embodiment of the disclosed invention.
Figure 11:
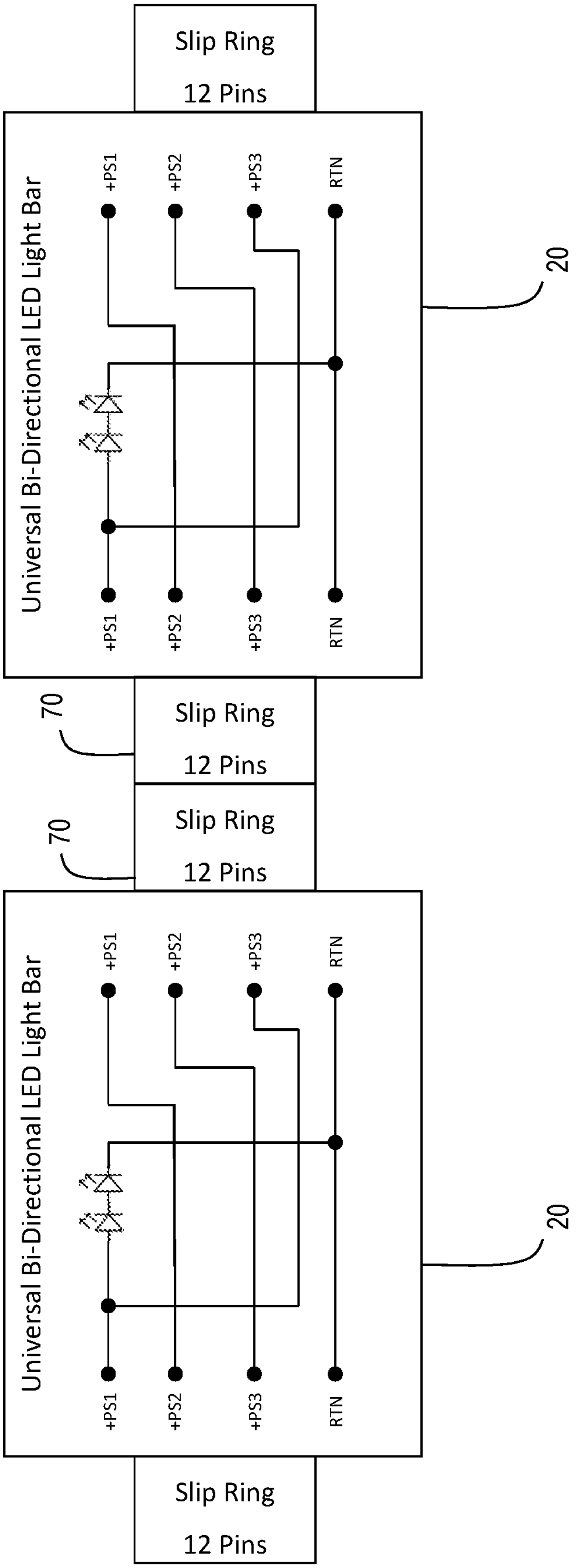
FIG. 11 is an electrical diagram of a lighting module to lighting module connection in accordance with an embodiment of the disclosed invention.

Referring to FIGS. 10 and 11, another module 20 may be interconnected adjacently to module 20 by inserting link 90 between the adjacent modules 20 so that a bearing surface 94 of link 90 is received within coupler 70 of one module 20, and the other bearing surface 96 is received within coupler 70 of the other module 20. Adjacent modules 20 may be secured to each other using hinged clamp 120 that can be closed around flanges 80 of adjacent couplers 70 and locked in place as described above. End caps 130 may be inserted into any free couplers 70 to provide an environmental seal. As seen in FIG. 11, adjacent modules 20 are also electrically interconnected by link 90.

While use of link 90, coupler 70, and hinged clamp 120 to secure adjacent lighting modules 20 has been described, in certain other embodiments the lighting modules may have a male coupler positioned at one end of housing 40 and a female coupler positioned at an opposing end of housing 40. Adjacent lighting modules may be secured when male couple and female coupler are joined. The lighting modules configuration (e.g., shape and dimensions) and connection have been described in U.S. Pat. No. 11,209,153, the entire disclosure of which, except for any disclaimers, disavowals, and inconsistencies, is incorporated herein by reference.

Figure 12:
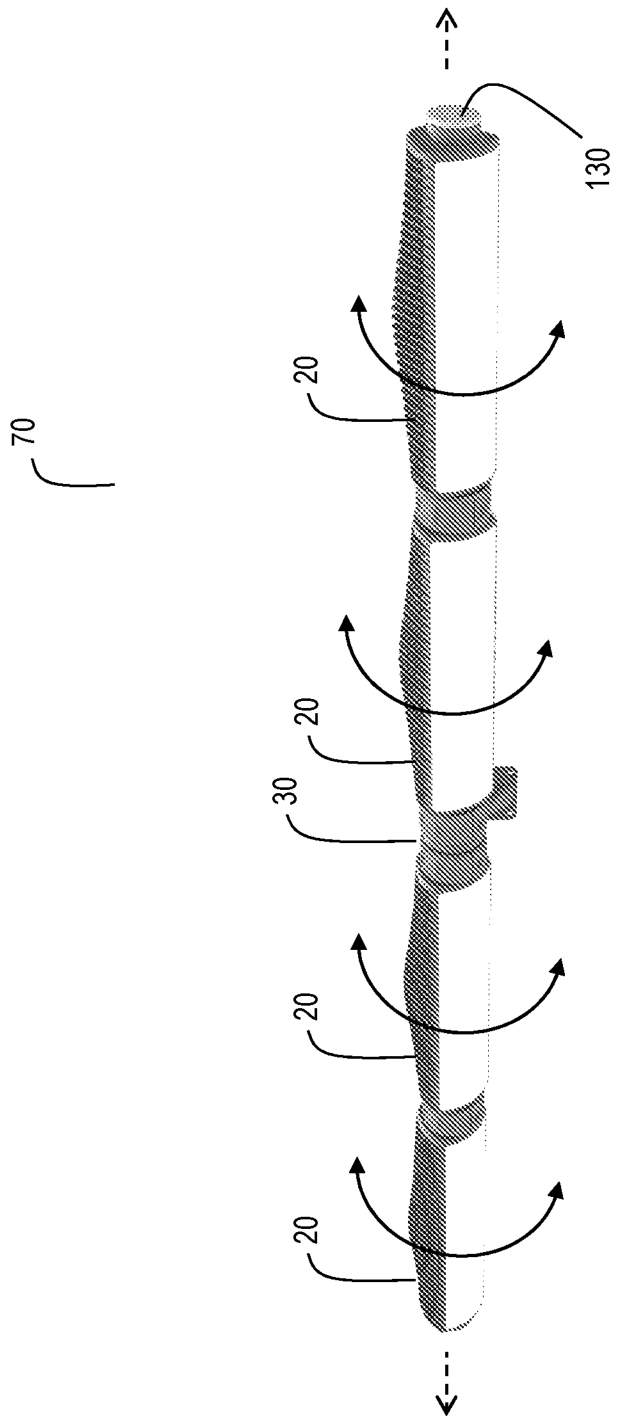
FIG. 12 is a perspective view showing axial rotation of a series of interconnected lighting modules according to an embodiment of the disclosed invention.

Referring to FIG. 12, cylindrical bearing surfaces of link 90 allow adjacent lighting modules 20, as well as lighting modules 20 coupled to mount 30, to be rotated about longitudinal axis X-X. The orientation of the rectangular illumination provided by module 20 may thus be adjusted in a single direction, i.e., about a single axis, via rotation of lighting module 20 about axis X-X. Servo motors may be incorporated into link 90, coupler 70, and/or clamp 120 to allow for remote rotation of lighting modules 20 about axis X-X.

Figure 13:
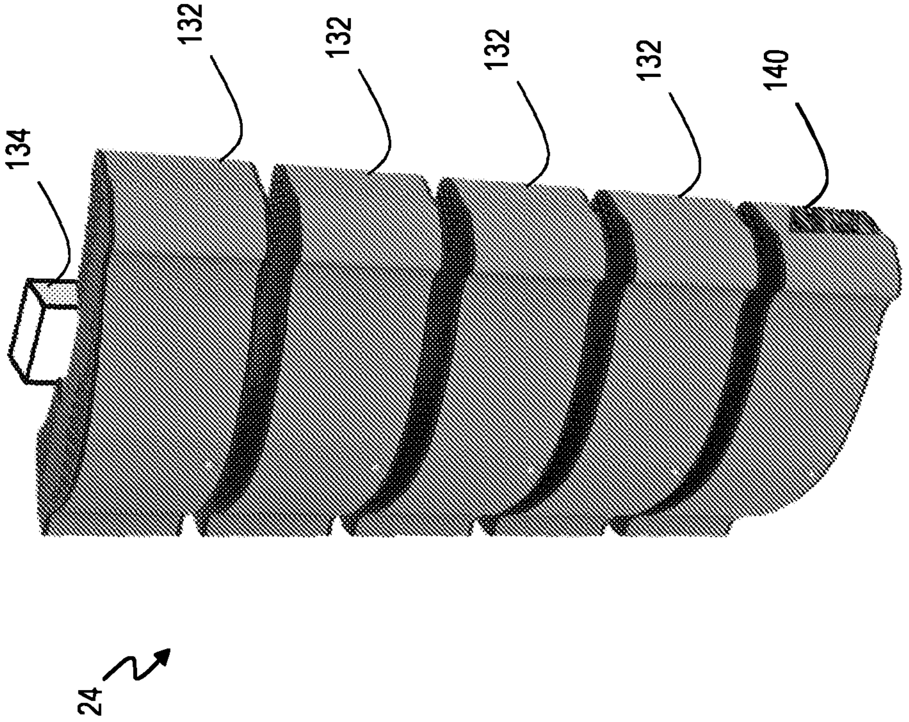
FIG. 13 is a perspective view of a controller stack in accordance with an embodiment of the disclosed invention.
Figure 14:
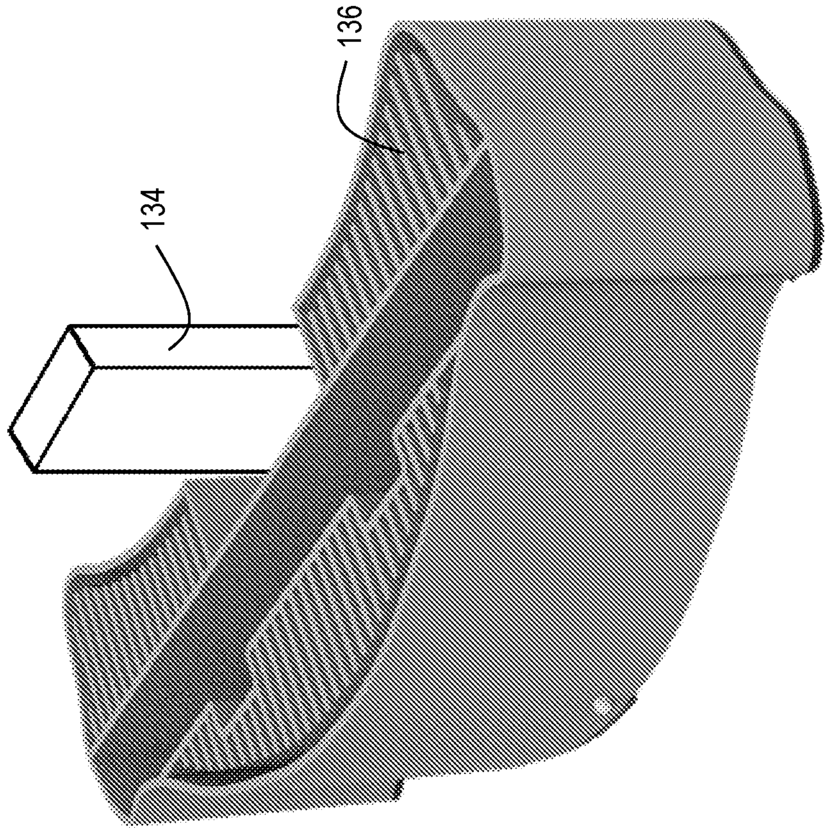
FIG. 14 is a perspective view of a core enclosure in accordance with an embodiment of the disclosed invention.
Figure 15:
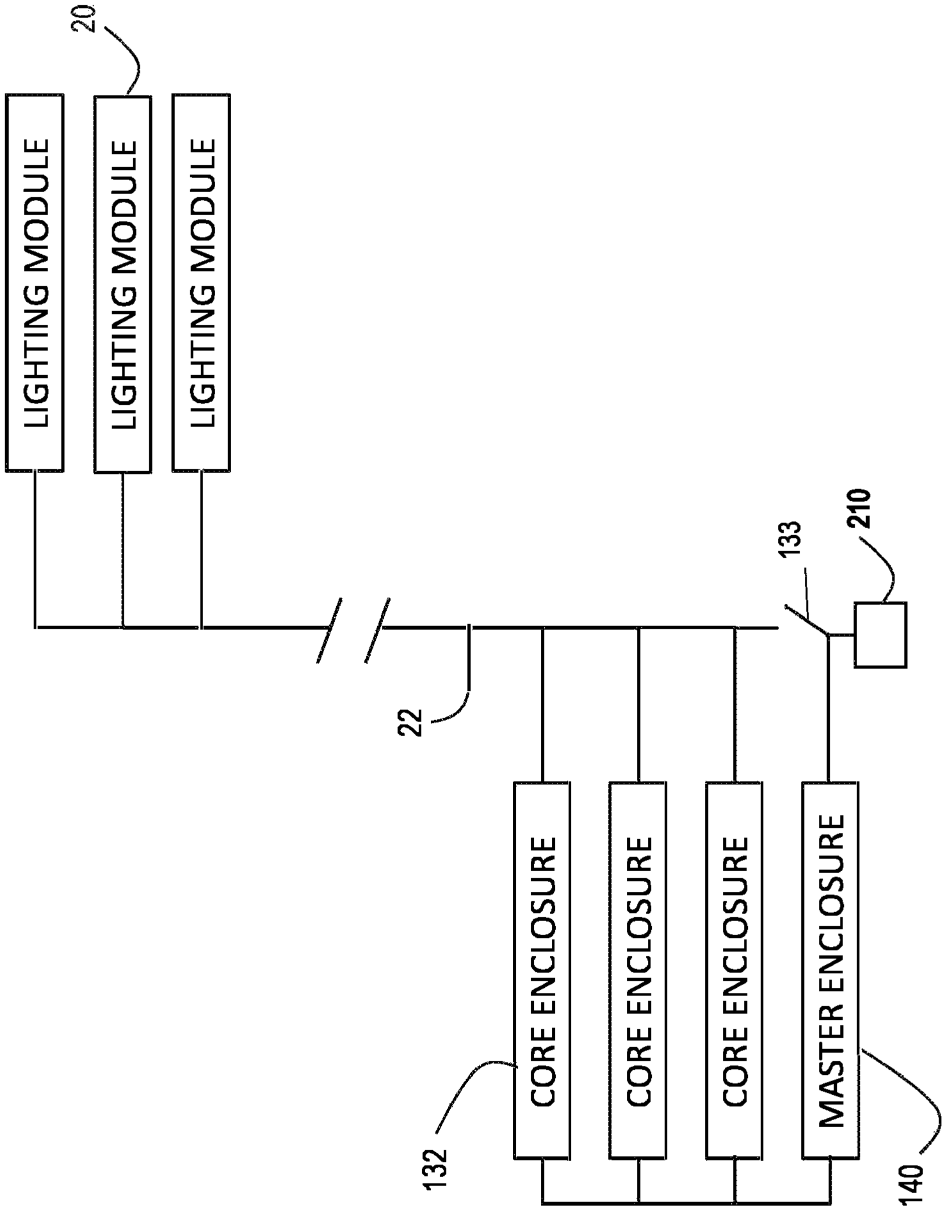
FIG. 15 is a high-level schematic of the electronics for a core enclosure in accordance with an embodiment of the disclosed invention.

Referring to FIGS. 13 through 15, control stack 24 comprises a series of core enclosures 132, each of which houses the power conversion and LED electronics, typically referred to as LED drivers, for an associated lighting module 20, as well as a master enclosure 140 that provides housekeeping functions. Control stack 24 includes a backplane 134 that provides the electrical interconnections between each core enclosure 132 and master enclosure 140 as well as the requisite interconnections to wiring harness 22 to interconnect control stack 24 to lighting modules 20. Backplane 134 is preferably adapted to act as a heat sink and transfer excess heat to support pole 12 for additional dispersion of heat generated by control stack 24. As seen in FIG. 14, core enclosure 132 and master enclosure 140 include ribs 136 for dissipation of heat.

Referring to FIG. 15, each core enclosure 132 is associated with and coupled via wiring harness 22 to a corresponding lighting module 20. The master controller 140 has a circuit 133 in connected to the power supply a configured to switch to power from battery 210.

Figure 16:
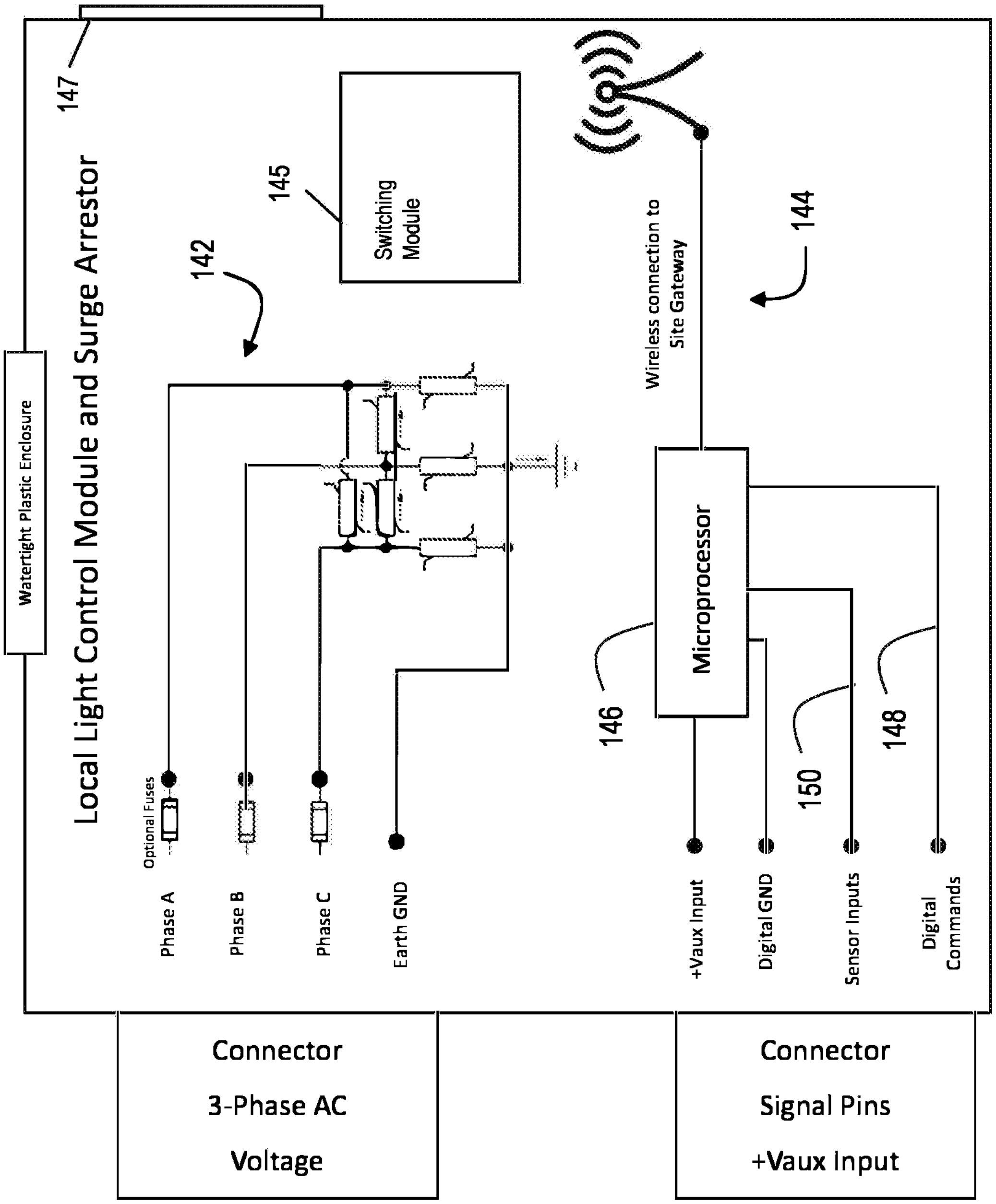
FIG. 16 is a is high level schematic for a lighting system in accordance with an embodiment of the disclosed invention.

Referring to FIG. 16, master enclosure 140 includes electronics for supervision and control of each core enclosure 132. For example, master enclosure 140 may include a switching module 145 which may include circuit 133. The circuit 133 may be, for example, configured to detect a drop in voltage to the main lights and provide instructions to each core enclosure 132 to switch from the AC power supply to battery 210 when the voltage drop is at or below a threshold value.

Master enclosure 140 may also include a surge arrestor 142. Master enclosure 140 may further include a communication interface 144 and a microprocessor 146 for establishing connection with a remotely positioned host system or devices that can provide commands for how lighting module 20 should be operated. Communication interface 144 could include any conventional wireless communication system or protocol, such as WiFi, Bluetooth®, BLE, ZigBee, Z-Wave, or cellular such as 4G or LTE, NFC, RFID, or LIDAR. Microprocessor 146 includes a digital command signal line 148 for sending commands to core enclosures 132 via backplane 134 and sensor input lines 150 for receiving feedback from core enclosures 132. In the event of a voltage drop, switching module 133 may, for example, send a signal to microprocessor 146 to send commands to core enclosure 132 to switch to the battery 210.

Still referring to FIG. 16, once a voltage drop occurs, a black out or brown-out situation may occur, and other equipment may cease operating. The master controller 140 may be connected to cameras or emergency communication systems and may activate such systems. The master controller may also, for example, signal officials or other auxiliary power systems.

Figure 17:
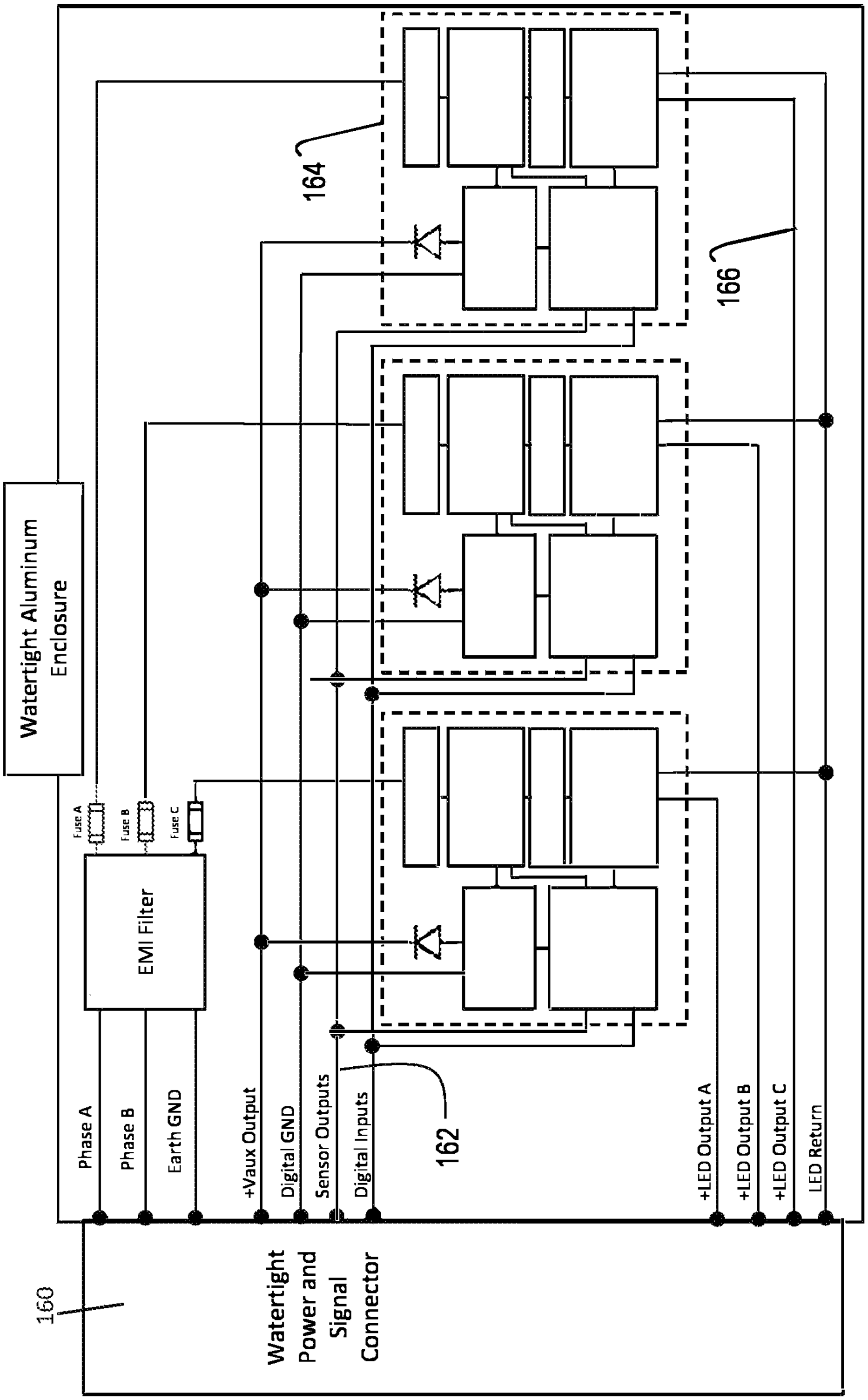
FIG. 17 is a schematic of the electrical configuration of an asymmetric source sports lighting system in accordance with an embodiment of the disclosed invention.

Referring to FIG. 17, each core enclosure 132 includes a watertight connection 160 to back plane 134, which provides connectivity to digital command signal line 148 as well as local AC power. Core enclosure 132 also includes sensor outputs 162 interconnected to sensor input line 150 of microprocessor 146 to provide feedback on operation of core enclosure 132. Core enclosure 132 also includes an LED driver 164 for each asymmetrically driven row of LEDs of lighting module 20 interconnected to that core enclosure 132.

Figure 18:
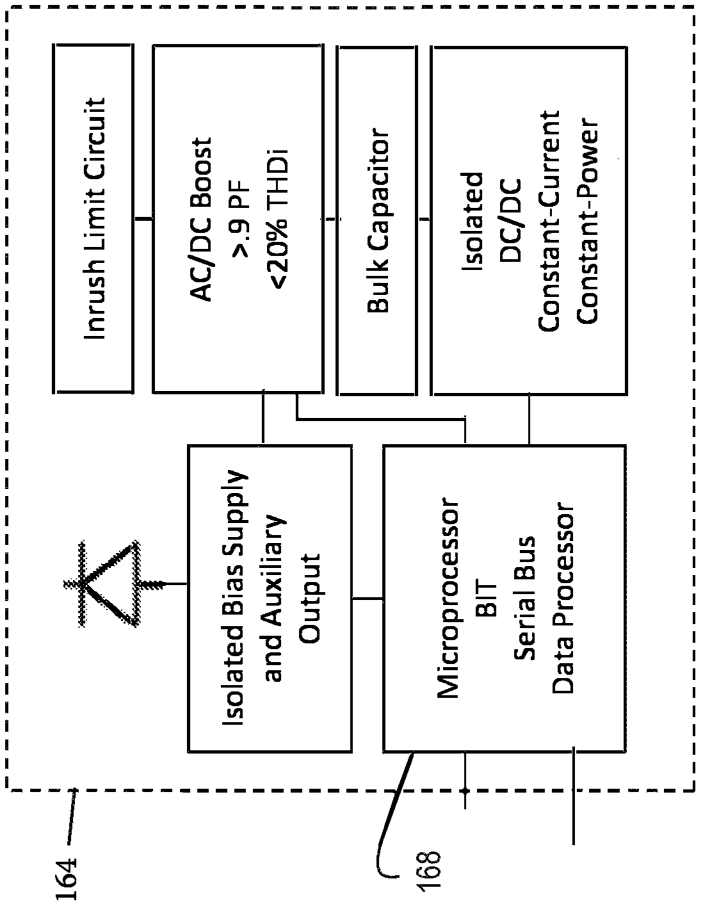
FIG. 18 is a schematic of the LED driver of FIG. 17, in accordance with an embodiment of the disclosed invention.

As seen in FIG. 18, each LED driver 164 is connected to a corresponding output line 166 that is connected via backplane 134 to wiring harness 22 and thus one corresponding lighting module 20. Core enclosure 132 provides for AC to high voltage DC power conversion as well as power level control via LED driver 164. LED driver 164 may include an inrush limiter circuit, an AC/DC boost, a bulk capacitor, an isolated DC/DC constant current, constant power circuit, and an isolated bias supply and auxiliary output. Each LED driver 164 of core enclosure also includes a local microprocessor 168 responsive to commands from microprocessor 146 of master enclosure 140. The output of each LED driver 164 is therefore controllable via microprocessor 146 of core enclosure 132 and microprocessor 168, which may then in turn be controllable via communication interface 144 from a remote location. In the event of a voltage drop, switching module 145 may signal microprocessor 146 to provide commands to each LED driver 164 to adjust the output to the corresponding module 20. For example, if there is a voltage drop from 14V to 9V or less, a switch to battery power occurs. Commands may be provided by microprocessor 146 to each LED driver 164 to activate auxiliary emergency lighting (e.g., auxiliary emergency lighting 200 in FIG. 2). The auxiliary lighting may be operated as the main lighting decreases in intensity.

In other embodiments, upon switching to battery power, commands may be sent to each LED driver 164 to turn off certain lighting modules 20 while leaving other lighting modules 20 on. In still other embodiments, all lighting modules 20 may continue operation using battery power.

The battery 210 may provide, for example, 12V-14V and may have a capacity to power the auxiliary emergency lighting for 20 minutes, allowing enough time for people to leave the premises. Battery capacity may vary with the venue in which the lighting is operating. For larger venues, a higher capacity battery may be connected, or a plurality of batteries may be connected.

Figure 19:
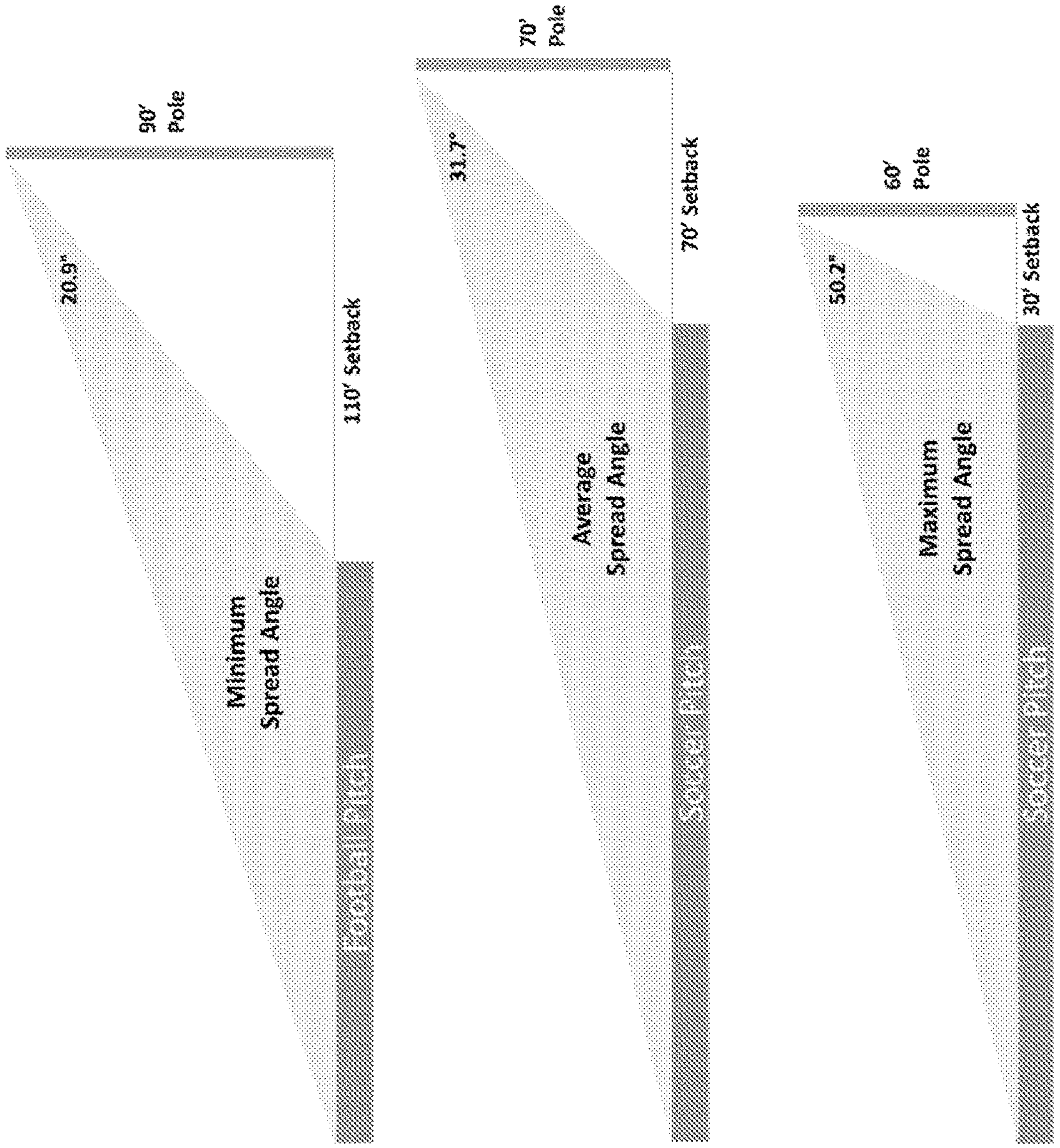
FIG. 19 is a schematic of beam steering using a lighting system, in accordance with an embodiment of the disclosed invention.

Referring to FIG. 19, asymmetric illumination source 44 of each module 20 allows for remote beam steering of lighting system 10. Lighting system 10 may be adapted to a particular installation regarding the width of the pitch to be illuminated, the height of support pole 12, and the distance between support pole 12 and the targeted pitch. For example, asymmetric illumination source 44 may be driven to change the beam angle (generally recognized as the region of illumination with at least fifty percent of the maximum beam strength) to provide the appropriate amount of illumination between a minimum and maximum spread angle encountered in an installation.

In the first scenario of FIG. 19, where the height of support pole 12 and setback distance require a minimum spread angle, asymmetric illumination source 44 can be driven asymmetrically in a first configuration to provide a narrow beam angle without having to physically reorient modules 20. In the last scenario, where the height of pole 12 and setback distance require a minimum spread angle, asymmetric illumination source 44 can be driven asymmetrically in a different configuration to provide a broader spread angle without having to physically reorient modules 20. Thus, the effective positioning of modules 20 can be adjusted without having to physically reorient modules 20. Thus, modules 20 may be asymmetrically driven to change the illumination scenario for different events or conditions, or to simply adjust the illumination in a given location without having to physically move lighting modules 20.

Figure 20:
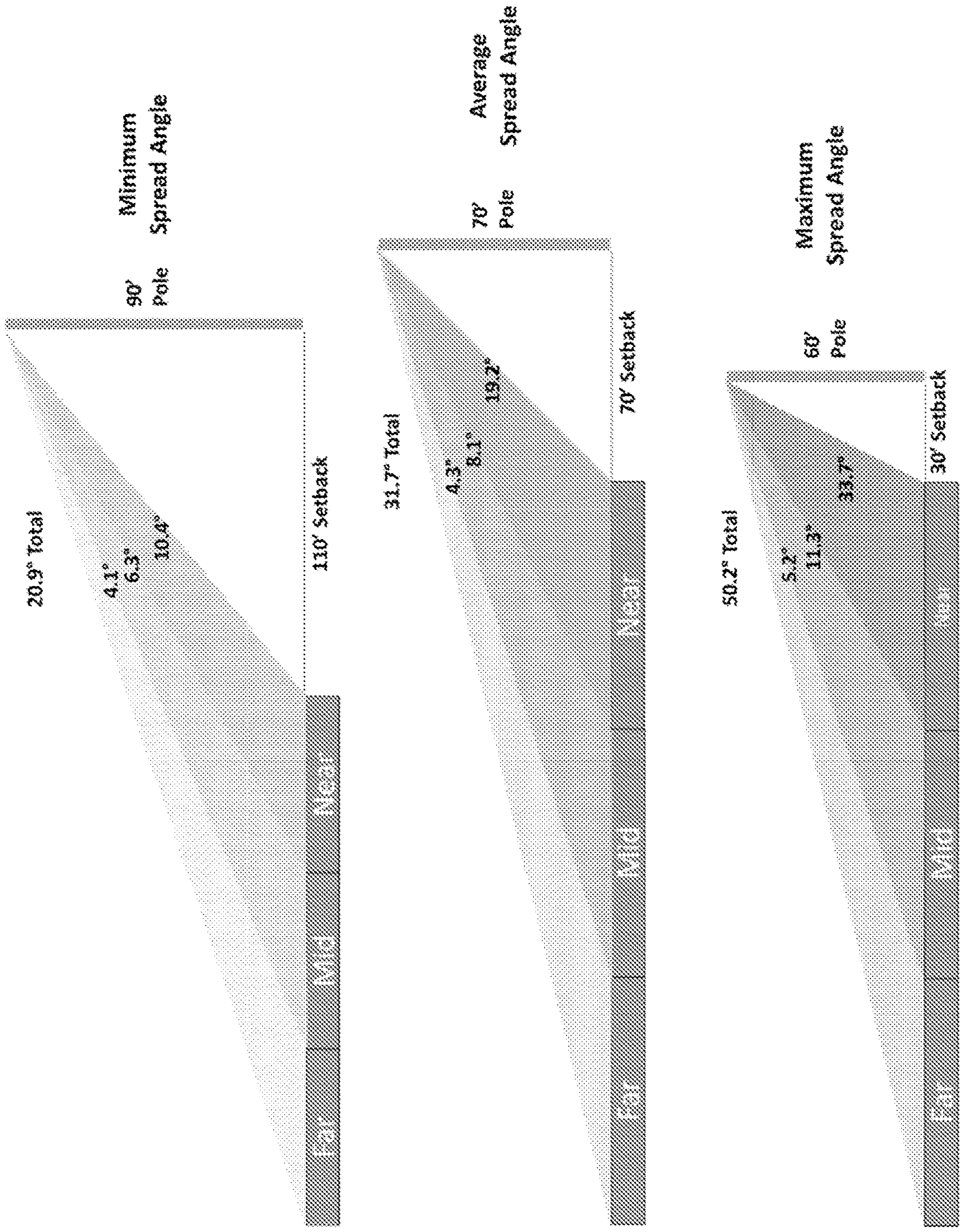
FIG. 20 is a schematic of beam angles changes using a lighting system, in accordance with an embodiment of the disclosed invention.

FIG. 20 illustrates how the power control over each row 50 of asymmetric illumination source 44 can be adjusted to impact the beam angle emitted from lighting module 20 without having to rotate lighting module 20.

Figure 21:
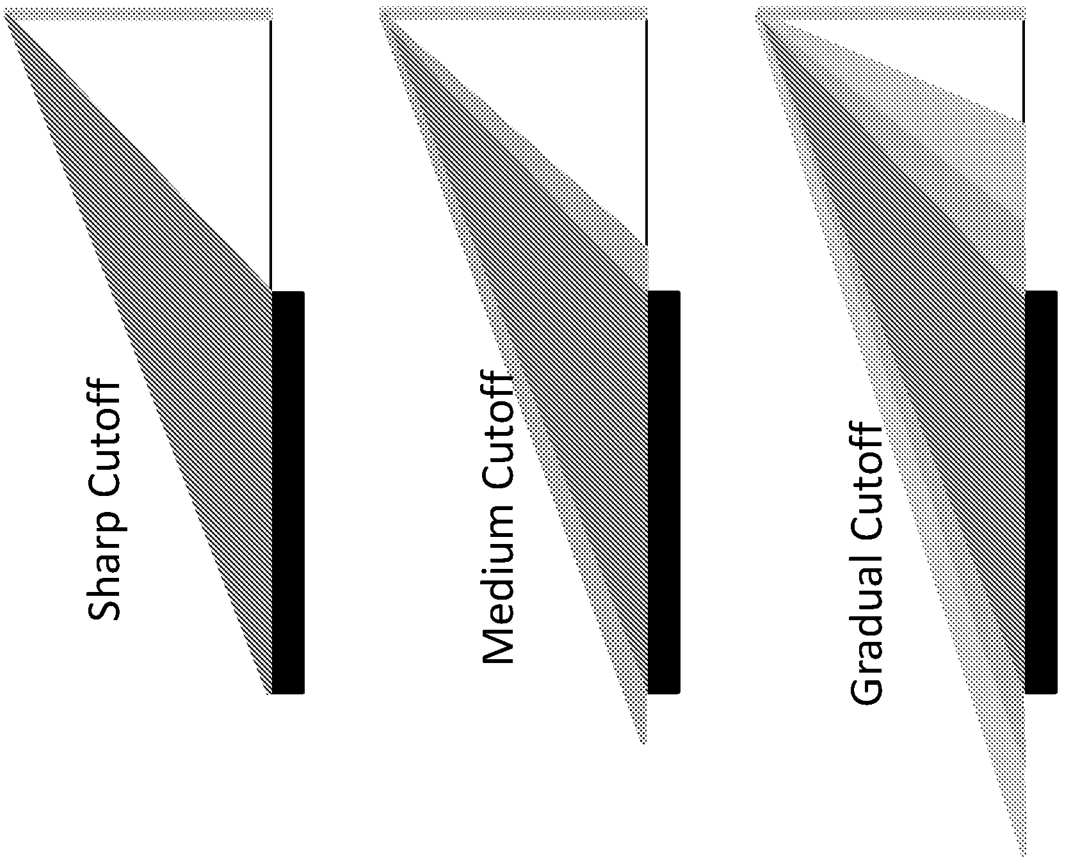
FIG. 21 is a schematic of tunable cut-off in a lighting system, in accordance with an embodiment of the disclosed invention.

Referring to FIG. 21, the asymmetric illumination source 44 of each lighting module 20 provides for a tunable cut-off for the illumination generated from lighting module 20. Illumination cut-off generally refers to the amount of illumination in the beam field that extends beyond the desired beam angle (any area of illumination with less than fifty percent but more than ten percent of the maximum beam strength). For example, in the first scenario of FIG. 20, the cut-off is very sharp, i.e., there is very little spillage beyond the main beam angle. In the second and third scenarios, the spillage increases such that more illumination is provided ancillary to the primary beam angle. Asymmetric illumination source 44 may be driven to change the cut-off at any time, whether finally upon installation, or dynamically over time to change the lighting scheme as desired by a user for different applications. For example, a gradual cut-off may be selected when more light is desired in the areas surrounding a pitch for a particular event, such as a pre-game show, and then adjusted to provide a sharp cut-off during a game. Thus, asymmetric illumination source 44 allows for control over both the beam angle and the beam field relative to each other and relative to the illumination target.

Figure 22:
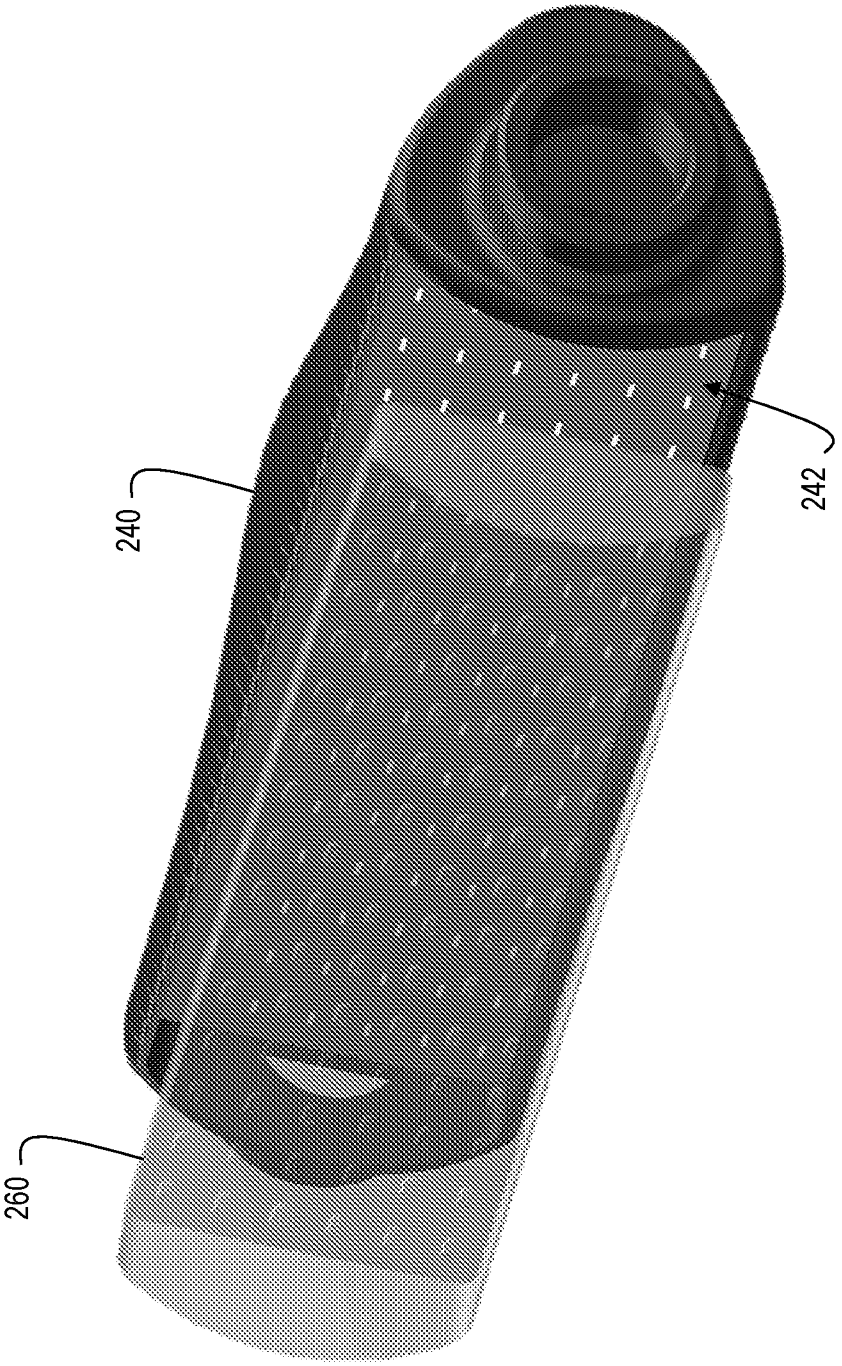
FIG. 22 is a perspective view of an environmental sealing system for a lighting module, in accordance with an embodiment of the disclosed invention.
Figure 23:
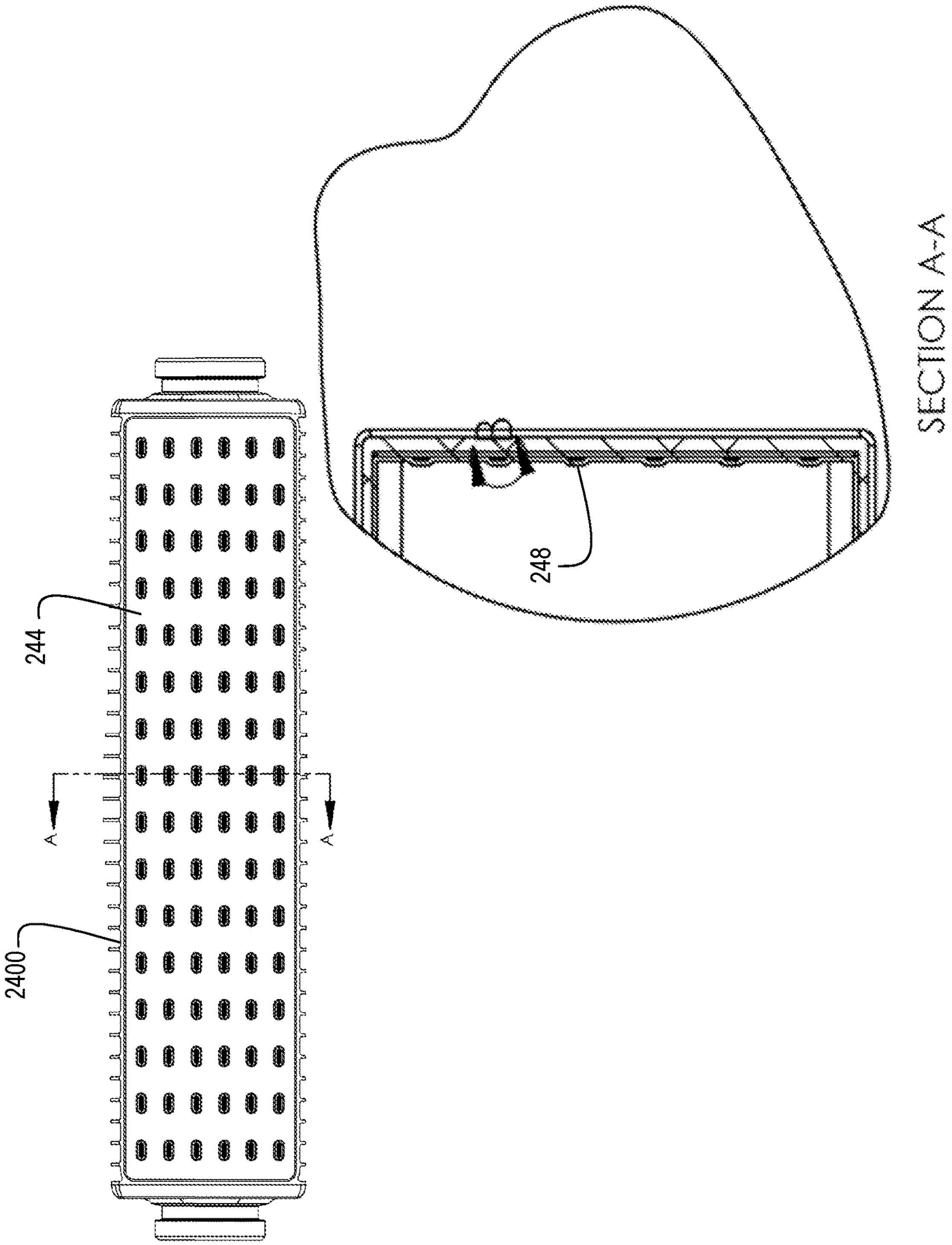
FIG. 23 is a front view of an environmental sealing system for a lighting module, in accordance with an embodiment of the disclosed invention.
Figure 24:
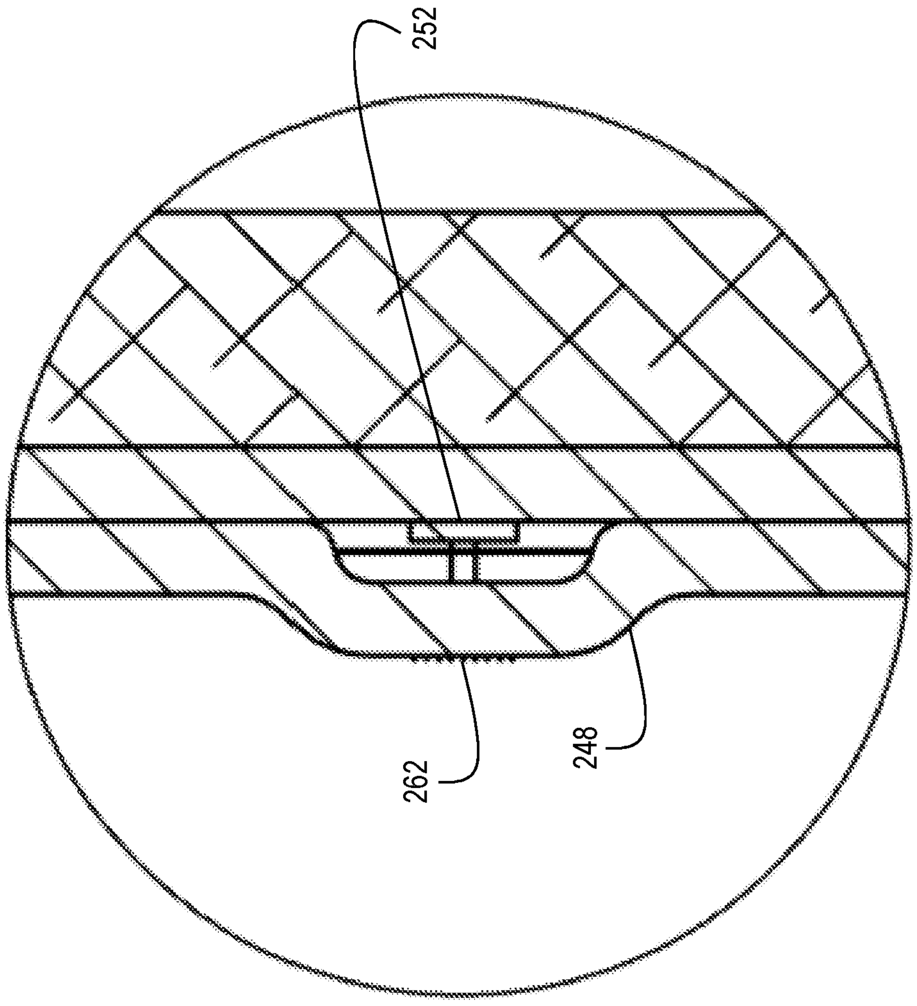
FIG. 24 is a side view of a micro-lens for a lighting module in accordance with an embodiment of the disclosed invention.

Referring to FIG. 22, lighting module 20 may be constructed using a housing 240 that encloses an asymmetric illumination source 244 and is environmentally sealed prior to attachment of lens array 260. As seen in FIG. 23, housing 240 includes a resilient optical layer 248 positioned over asymmetric illumination source 244 and captured within rectangular opening 242 to seal housing 240 from environmental infiltration. As a result, lens array 260 may be attached or removed from housing 240 in the field, such as to adjust the optical conditioning being provided, without compromising the environmental integrity of housing 240. Optical layer 248 is preferably formed from a moldable optical silicone, such as SILASTIC® MS-1002 moldable silicone and related moldable silicone compounds. As seen in FIG. 24, optical layer 248 may include micro-lenses 262 molded therein and in alignment with each LED set 252 of asymmetric illumination source 244. Optical layer 248 thus performs pre-modulation of the illumination from lighting module 20. Micro-lenses 262 allow for finer optical texturing than with lens array 260 alone. In addition, as lens array 260 does not need to perform as much optical conditioning, lens array 260 can be smaller and thus lighter than otherwise possible.

Figure 25:
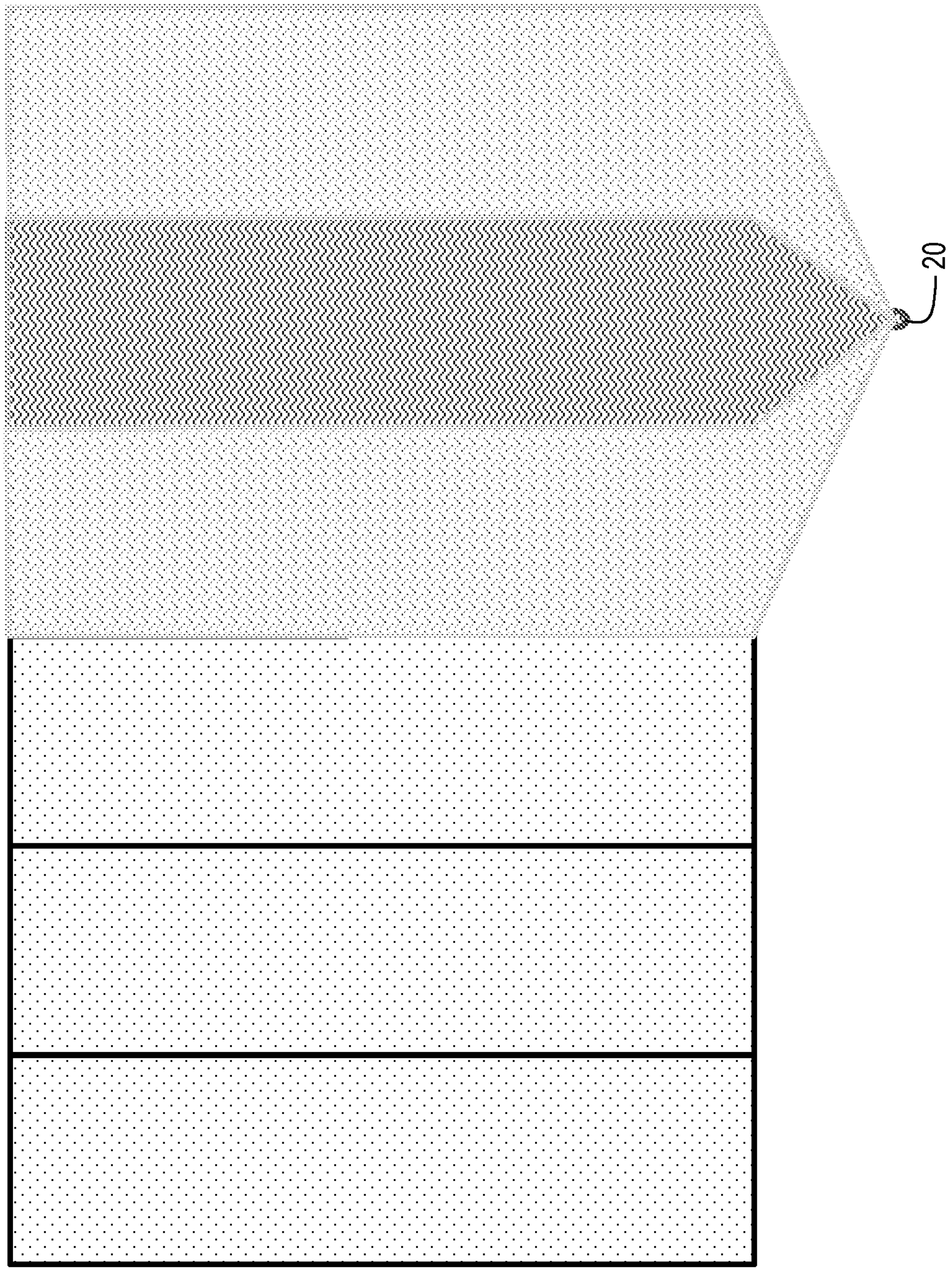
FIG. 25 is a first view of illumination steering using a lens array, in accordance with an embodiment of the disclosed invention.
Figure 26:
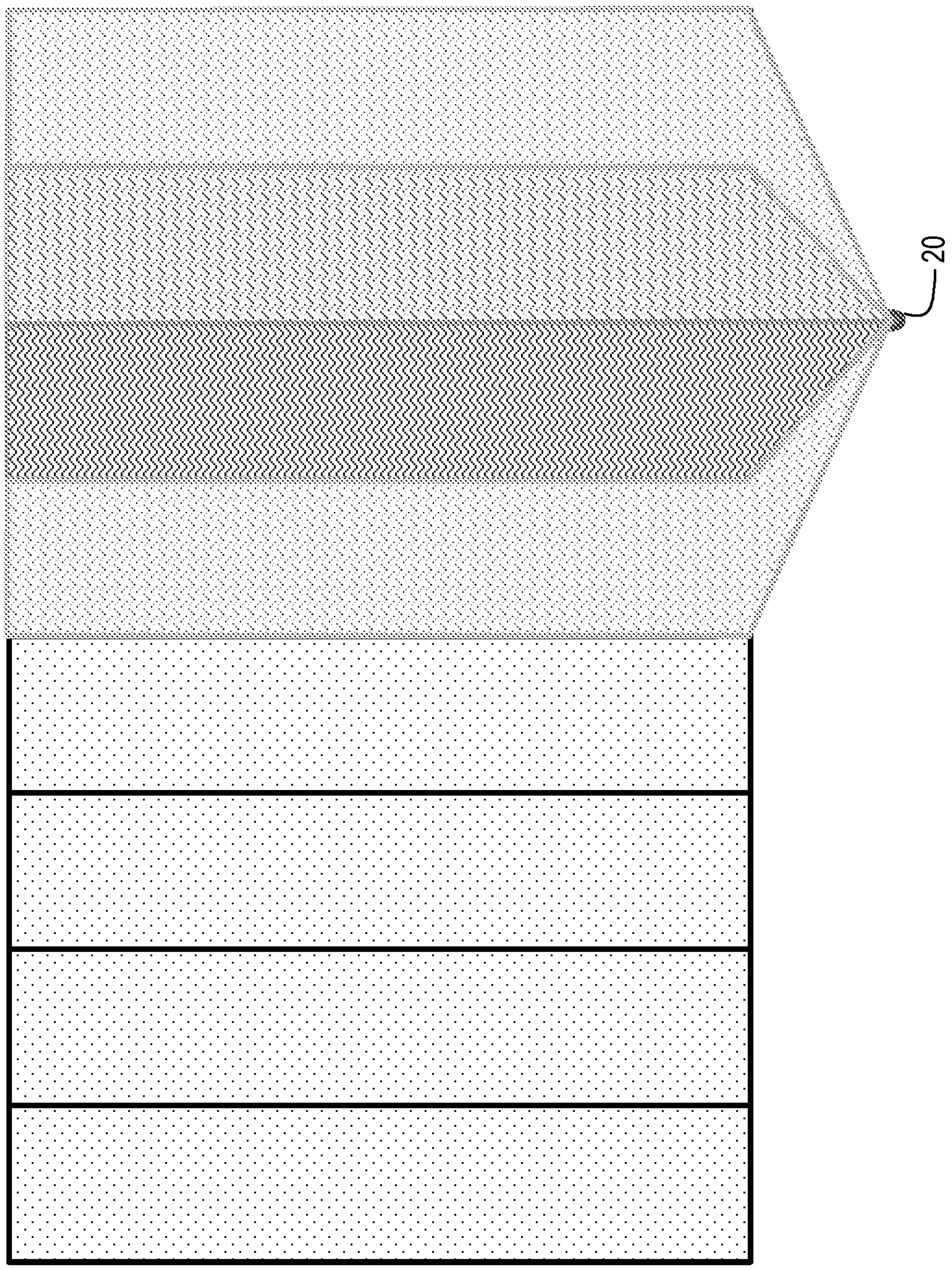
FIG. 26 is a second view of illumination steering using a lens array, in accordance with an embodiment of the disclosed invention.
Figure 27:
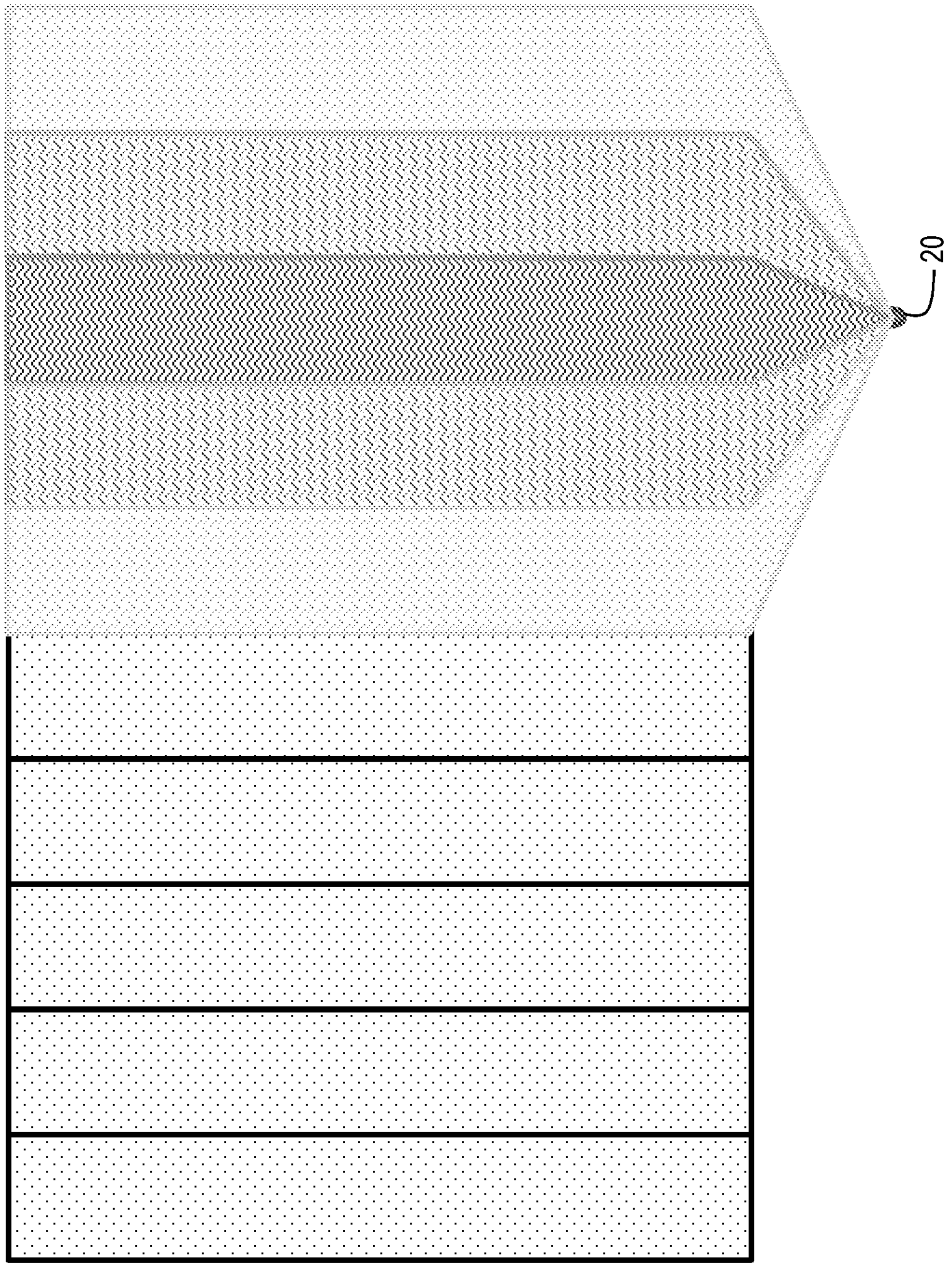
FIG. 27 is a third view of illumination steering using a lens array, in accordance with an embodiment of the disclosed invention.
Figure 28:
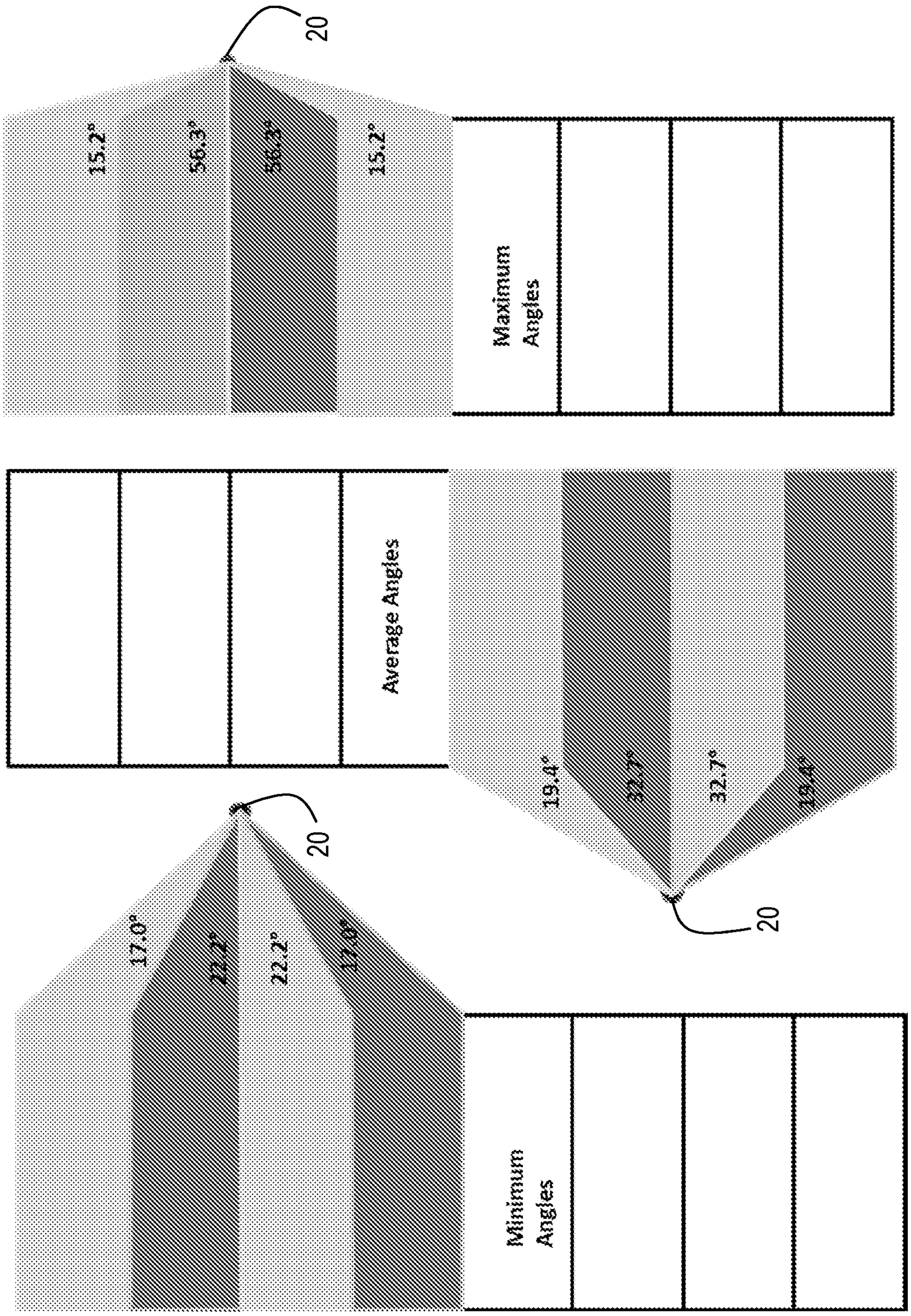
FIG. 28 is a fourth view of illumination steering using a lens array, in accordance with an embodiment of the disclosed invention.

Referring to FIGS. 25 through 27, lighting module 20 may be outfitted with lens array 60 configured to steer illumination into three, four, or five different regions. For example, each installation may include a different number of support poles 12, so an appropriate lens array 60 distributing illumination into three, four, or five different regions may be used. As is known in the field, illumination from each support pole 12 may need to overlap with illumination for other support poles 12 to provide the desired illumination, reduce or control shadowing, etc. As seen in FIG. 28, lighting module 20 can provide a wide or narrow area of illumination using variously designed lens arrays 60 to steer illumination between a minimum and maximum distribution angle.

As described above, the present invention may be a system, a device, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general-purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A lighting system, comprising:

at least one lighting module, the lighting module comprising a housing extending from first end to a second end along a longitudinal axis and having an elongated opening in alignment with an illumination source therein;

a first coupler positioned at the first end of the housing and having a first cylindrical portion extending longitudinally outward from the housing and a first flange extending radially outwardly from the first cylindrical portion, wherein the first cylindrical portion defines an outwardly facing bearing surface and has an end face having a first set of electrical contacts and a first set of auxiliary electrical contacts; and a second coupler positioned at the second end of the housing and having a second cylindrical portion extending longitudinally outward from the housing and a second flange extending radially outwardly from the second cylindrical portion, wherein the second cylindrical portion has an internal bore that permits access to a second set of electrical contacts and a second set of auxiliary electrical contacts positioned within the internal bore;

an auxiliary lighting module, the auxiliary lighting module comprising a housing having an opening and an illumination source therein, and a coupler connected to the auxiliary lighting module housing, the auxiliary lighting module coupler having a set of auxiliary module electrical contacts and the coupler configured for connection to one of the first coupler or the second coupler;

a local power source; and a controller stack connected to the at least one lighting module by a first set of wiring, and connected to the auxiliary lighting module by a second set of wiring, the controller stack comprising:

an alternating current power supply; and a switching circuit having a voltage monitor connecting the alternating current power supply and the first set of wiring, and the local power source and the second set of wiring, the voltage monitor measuring for a voltage drop threshold;

wherein the first set of electrical contacts are interconnected to the second set of electrical contacts internally of the lighting module housing; and wherein the second set of wiring connects the first set of auxiliary electrical contacts and the second set of auxiliary electrical contacts.

2. The lighting system of claim 1, wherein the switching circuit switches from the alternating current power supply to the local power source once the voltage drop threshold is reached, the local power source providing power to the auxiliary lighting module.

3. The lighting system of claim 2, wherein the switching circuit, after switching to local power source, turns off the at least one lighting module.

4. The lighting system of claim 1, wherein the local power source is charged by the power supply.

5. The lighting system of claim 1, wherein the auxiliary lighting module is connected by the coupler to at least one lighting module.

6. The lighting system of claim 1, wherein the controller stack further comprises a wireless communication module, wherein the wireless communication module is activated once a voltage drop threshold is reached.

7. The lighting system of claim 1, wherein the local power source comprises at least one battery.

8. The lighting system of claim 1, wherein the illumination source may be driven to change a beam angle without having to rotate the lighting module.

9. The lighting system of claim 1, wherein the illumination source may be driven to change an illumination cut-off.

10. The lighting system of claim 1, wherein the housing is environmentally sealed and a lens array is attached to the sealed housing.

11. A lighting system, comprising:

at least one lighting module, the lighting module comprising a housing extending from first end to a second end along an axis and having an elongated opening, in alignment with an illumination source therein;

a first coupler positioned at the first end of the housing and having a first cylindrical portion extending longitudinally outward from the housing and a first flange extending radially outwardly from the first cylindrical portion, wherein the first cylindrical portion defines an outwardly facing bearing surface and has an end face having a first set of electrical contacts and a first set of auxiliary electrical contacts; and a second coupler positioned at the second end of the housing and having a second cylindrical portion extending longitudinally outward from the housing and a second flange extending radially outwardly from the second cylindrical portion, wherein the second cylindrical portion has an internal bore that permits access to a second set of electrical contacts and a second set of auxiliary electrical contacts positioned within the internal bore;

an auxiliary lighting module connected to a pole, the auxiliary lighting module comprising a housing having an opening and an illumination source therein, and a coupler connected to the auxiliary lighting module housing, the auxiliary lighting module coupler having a set of auxiliary module electrical contacts and the coupler configured for connection to one of the first coupler or the second coupler;

a local power source; and a controller stack connected to the at least one lighting module by a first set of wiring, and connected to the auxiliary lighting module by a second set of wiring, the controller stack comprising:

an alternating current power supply; and a switching circuit having a voltage monitor connecting the alternating current power supply and the first set of wiring, and the local power source and the second set of wiring, the voltage monitor measuring for a voltage drop threshold;

wherein the first set of electrical contacts are interconnected to the second set of electrical contacts internally of the lighting module housing; and wherein the second set of wiring connects the first set of auxiliary electrical contact and the second set of auxiliary electrical contacts.

12. The lighting system of claim 11, wherein the switching circuit switches from the alternating current power supply to the local power source once the voltage drop threshold is reached, the local power source providing power to the auxiliary lighting module.

13. The lighting system of claim 12, wherein the switching circuit, after switching to local power source, turns off at the least one lighting module.

14. The lighting system of claim 11, wherein the local power source is charged by the power supply.

15. The lighting system of claim 11, wherein the auxiliary lighting module is connected by the coupler to at least one lighting module.

16. The lighting system of claim 11, wherein the controller stack further comprises a wireless communication module, wherein the wireless communication module is activated once a voltage drop threshold is reached.

17. The lighting system of claim 11, wherein the local power source comprises at least one battery.

18. The lighting system of claim 11, wherein the illumination source may be driven to change the beam angle without having to rotate the lighting module.

19. The lighting system of claim 11, wherein the illumination source may be driven to change the illumination cut-off without having to rotate the at least one lighting module.

20. The lighting system of claim 11, wherein the housing is environmentally sealed and a lens array is attached to the sealed housing.

21. The lighting system of claim 11, wherein the axis is parallel to the pole.

* * * * *